United States Patent
Barnoski et al.

(10) Patent No.: US 7,343,770 B2
(45) Date of Patent: Mar. 18, 2008

(54) STAMPING SYSTEM FOR MANUFACTURING HIGH TOLERANCE PARTS

(75) Inventors: Michael K Barnoski, Pacific Palisades, CA (US); David Cohen, Oak Park, CA (US); Dan Harris, Hickory, NC (US); Sangkyun Kang, Palo Alto, CA (US); Anthony Levi, South Pasadena, CA (US); Miguel Pinilla, San Carlos, CA (US); Fritz Prinz, Woodside, CA (US); Alex Tarasyuk, Los Angeles, CA (US)

(73) Assignee: Nanoprecision Products, Inc., Los Angeles, CA (US)

( * ) Notice: Subject to any disclaimer, the term of this patent is extended or adjusted under 35 U.S.C. 154(b) by 508 days.

(21) Appl. No.: 10/620,851

(22) Filed: Jul. 15, 2003

(65) Prior Publication Data

US 2004/0091215 A1  May 13, 2004

(51) Int. Cl.
  B21D 28/26 (2006.01)
  B26D 5/08 (2006.01)
  B21J 13/04 (2006.01)

(52) U.S. Cl. .............. 72/456; 72/455; 72/329; 72/335; 72/337; 72/339; 72/432; 72/442; 83/278; 83/637; 83/684; 83/698.91; 100/214; 76/107.1

(58) Field of Classification Search .......... 72/362, 72/432, 442, 446, 329, 335, 337, 339, 384, 72/394, 420, 421, 455, 456; 83/146, 531, 83/278, 637, 684, 693, 698.91; 76/107 R; 100/214

See application file for complete search history.

(56) References Cited

U.S. PATENT DOCUMENTS 2,336,982 A    12/1943  Cremer (Continued)

FOREIGN PATENT DOCUMENTS

EP   0201944   11/1986

(Continued)

OTHER PUBLICATIONS

International Search Report of Counterpart PCT Application No. PCT/US03/25939.

(Continued)

*Primary Examiner*—David B Jones
(74) *Attorney, Agent, or Firm*—Liu & Liu

(57) ABSTRACT

A system and process for stamping parts having tolerances below 1000 nanometers. The inventive system and process is particularly suited for producing optoelectronic parts. The system includes a stamping press and one or a progression of stamping stations for supporting a punch and die. The stamping stations are designed to maintain substantial alignment of the punch and die with minimal moving components. The stamping station includes a shaft for rigidly guiding the punch to the die. The stamping press is capable of providing the punch with the necessary force to perform the stamping operations. The system includes an interface system for interfacing the force of the press with the punch, while simultaneously structurally decoupling the press from the punch. The system also includes a locating sub-plate, for locating the stamping station in alignment relative to each other, and means for in-line machine stock material before entry into the stamping stations.

25 Claims, 26 Drawing Sheets

U.S. PATENT DOCUMENTS

| | | | |
|---|---|---|---|
| 3,461,762 A * | 8/1969 | Putnam et al. ............... | 83/143 |
| 3,568,555 A * | 3/1971 | Stroh .......................... | 83/146 |
| 3,568,855 A * | 3/1971 | Seay et al. ................... | 213/8 |
| 3,709,083 A | 1/1973 | Doherty | |
| 3,861,192 A | 1/1975 | Suzuki et al. | |
| 3,933,071 A * | 1/1976 | Doring ........................ | 83/637 |
| 3,972,585 A | 8/1976 | Dalgleish et al. | |
| 4,030,336 A | 6/1977 | Grigorenko et al. | |
| 4,103,718 A * | 8/1978 | Steigerwald ................. | 72/329 |
| 4,292,862 A | 10/1981 | Thompson | |
| 4,458,985 A | 7/1984 | Balliet et al. | |
| 4,524,582 A | 6/1985 | Lucas et al. | |
| 4,555,968 A | 12/1985 | Raney et al. | |
| 4,887,452 A * | 12/1989 | Bakermans ................... | 72/420 |
| 4,926,677 A | 5/1990 | Waldner | |
| 5,113,736 A | 5/1992 | Meyerle | |
| 5,195,153 A | 3/1993 | Finzel | |
| 5,319,728 A | 6/1994 | Lu et al. | |
| 5,568,766 A | 10/1996 | Otremba et al. | |
| 5,791,186 A * | 8/1998 | Nishida et al. .............. | 72/339 |
| 6,122,952 A | 9/2000 | Rupp et al. | |
| 6,179,482 B1 | 1/2001 | Takizawa et al. | |
| 6,276,840 B1 | 8/2001 | Weiss et al. | |
| 6,311,597 B1 * | 11/2001 | Schroth et al. .............. | 83/531 |
| 6,389,940 B1 | 5/2002 | Long et al. | |
| 6,416,334 B1 | 7/2002 | Plishner | |
| 6,505,535 B1 | 1/2003 | Kurita et al. | |
| 6,986,301 B2 * | 1/2006 | Wade ........................... | 83/684 |
| 2001/0051026 A1 | 12/2001 | Steinberg et al. | |
| 2003/0068142 A1 | 4/2003 | Brezina et al. | |
| 2003/0070518 A1 | 4/2003 | Kurita et al. | |

FOREIGN PATENT DOCUMENTS

| | | |
|---|---|---|
| EP | 0287986 | 10/1988 |
| EP | 0299098 | 1/1989 |
| EP | 0410181 | 1/1991 |
| EP | 0423581 | 4/1991 |
| EP | 0716322 | 6/1996 |
| WO | WO-9815381 | 4/1998 |

OTHER PUBLICATIONS

Robertsson M E, et al., "Plastic Optical Connectors Molded Directly onto Optical Fibers and Optical Fiber Ribbons", IEEE, Jun. 1, 1993, pp. 498-504, New York, NY, USA.

International Search Report of Counterpart PCT Application No. PCT/US03/25940.

Partial International Search Report of Counterpart PCT Application No. PCT/US03/25940.

Partial International Search Report of Counterpart PCT Application No. PCT/US03/25939.

"Uni-Guide® Die System FAQ's" by Humdinger, Inc., pp. 1-5.

"Uni-Guide Die System, Patent Pending", Technical Discussion by Humdinger, Inc., pp. 1-6.

"Tech Trends, Round Die Set Works with Worn Presses", www.sme.org/forming&fabricating—Apr. 2000, p. 18.

"A New Design for Die Sets", www.metalforming.com, Aug. 2000, p. 66.

"The Uni-Guide Die System", www.uni-guide.com, Uni-Guide Products Brochure, pp. 1-4.

* cited by examiner

STAMPING SYSTEM FOR MANUFACTURING HIGH TOLERANCE PARTS

BACKGROUND OF THE INVENTION

1. Field of the Invention

The present invention relates to stamping system and processes, and more particularly stamping processes for manufacturing parts with high tolerances for various applications, such as optical fiber connection.

2. Description of Related Art

Precision parts are required in many applications, such as optical fiber based communication. Optical fiber based communication channels are the system of choice in many defense and commercial applications because of their high performance and small size. Particularly, fiber optics have "proved-in" in long distance applications, such as city-to-city and continent-to-continent communication spans, because of the lower cost of electrical-to-optical-to-electrical (E-O-E) conversion components, fiber amplifiers, and fiber cables relative to pure electrical systems using coaxial copper cable that do not requiring E-O-E. These long haul fiber systems can have hundreds of kilometers of fiber between terminals.

Shorter distance systems typically have only a few tens of kilometers of fiber between terminals, and very short reach (VSR) systems have only a few tens of meters of fiber between terminals. Although fiber links for telecom and datacom in metro, access and premise areas are short as compared to long haul links, there are a great many of them. The number of components required in the deployment of fiber for these types of applications is large. In these short systems, fiber optics "prove-in" is very sensitive to the cost of E-O-E terminal conversion devices and supporting circuitry, as well as any passive and active optoelectronic devices and equipment linked between terminal ends. Consequently, for optoelectronic active and passive components, sub-assemblies and assemblies to "prove-in" in short distance and VSR systems, their average sell prices must be lowered. Lowering of the average sell prices will help stimulate the unit volume necessary to justify investment in high speed manufacturing technologies.

A significant element of the cost of both active and passive fiber components and connectorized cable is the fiber connector itself. Precision ferrules and associated means for aligning them (e.g., precision split sleeve for single fiber connection, precision ground pins for multi-fiber connections) dominate the cost of current fiber connectors. The alignment components are normally required to align fibers to active and passive devices, as well as to align two fibers for demountable connection. Precision alignment of two polished fiber ends is needed to ensure that overall optical loss in a fiber link is equal or less than the specified optical connector loss budget for a system. For single-mode telecommunication-grade fiber, this typically corresponds to connector fiber alignment tolerances that are less than 1000 nm. Current connectors have not changed in basic design for more than 20 years, and it is generally accepted that they cost too much and are too difficult to assemble. The cost of manufacturing precision fiber connectors must decrease if fiber optic is to be the communication media of choice for short haul and VSR applications.

Connectors, in both parallel fiber and single fiber links, operating at multi-gigabit rates must be assembled with subcomponents fabricated with sub micron precision. As if producing parts with such precision levels were not challenging enough, for the resulting end product to be economical it must be done in a fully automated, very high-speed process.

Stamping processes have been deployed in manufacturing processes for mass-producing parts at low cost. However, heretofore, stamping processes have not been effective in producing parts with acceptable tolerances for optoelectronic components. In fact, there is no acceptable high-speed commercial production process that produces optoelectronic components with acceptable tolerances. U.S. Pat. No. 4,458,985 to Balliet et al. is directed to an optical fiber connector. Balliet describes in a cursory manner that some of the connector components can be produced by a coining or stamping process (e.g., col. 3, lines 20-21, 55-57). However, Balliet does not provide an enabling disclosure of such stamping process, let alone an enabling disclosure of a stamping process for producing parts within 1000 nm.

It is therefore desirable to have a manufacturing technology capable of producing parts for optoelectronic applications and other applications with tolerances within 1,000 nanometers and capable of running at very high speeds.

SUMMARY OF THE INVENTION

The present invention is directed to a stamping system and process for producing parts having tolerances below 1000 nm. The invention is particularly suited for producing optoelectronic parts, including, but not limited to, components, assemblies and subassemblies, and passive and active components. The system includes one or a progression of stamping stations for supporting a punch and die. The stamping stations include a novel structure for guiding the punch in substantial alignment with the die with tight tolerances. The system includes a press for providing the stamping stations with the necessary force to perform the particular stamping operation.

In one aspect of the present invention, the system is designed to minimize the number of moving components involved in the support structure in guiding the punch to the die. In one embodiment, the stamping station includes no moving component in the support structure in guiding the punch to the die. The stamping station includes a stationary punch holder structure having a shaft sized and shaped to receive the punch with tight tolerances. The punch is guided to the die by sliding through the shaft.

In another aspect of the present invention, the system includes a locating sub-plate having indexing features for precisely aligning the progression of stamping stations relative to each other. The locating sub-plate and its indexing features have exacting tolerances and sub-micron surface finishes.

In a further aspect of the present invention, the system includes an interface system for coupling the force of the press with the punch but structurally decoupling the press from the punch. The interface system also allows isolation of each stamping station so that operation at one station does not affect operation at another station. In one embodiment, the system includes a ball and socket arrangement, which allows the press to mechanically couple the force to the punch, but structurally decouple from the punch. In another embodiment, the system includes a hydraulic interface system. Hydraulic fluid mechanically couples the press to the punch and delivers a uniform force to the punch but structurally decouple the press from the punch. In still another embodiment, the system includes a combination of the ball and socket arrangement with hydraulic actuation of the punch. Hydraulic actuation allows for structural decoupling of the press from the punch while the ball and socket arrangement facilitates reducing structural stress on the stamping station components. By structurally decoupling the press from the ultra-precision tooling at the stamping stations and tooling, the inaccuracies of the press do not influence the ultra-precision of the stamping stations and tooling.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 3b is a sectional view of the stamping station taken along line 3b-3b in FIG. 3a.

FIG. 6a is a sectional view of the stamping station shown in FIG. 4, taken along line 6a-6a.

FIG. 9b is an exploded view of the punch and the die shown in FIG. 9a.

FIG. 9c is a sectional view of the die taken along line 9c-9c in FIG. 9a.

FIG. 11b is a perspective view of the final ferrule part produced from the "strip layout design" shown in FIG. 11a.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention is directed to a stamping system and process for manufacturing parts having tolerances below 1,000 nanometers (nm). The inventive system and process is particularly suited for producing optoelectronic parts, including, but not limited to, optoelectronic components, assemblies and sub-assemblies, and active and passive components. For purposes of illustrating the principles of the present invention and not by limitation, the present invention is described by reference to embodiments directed to stamping processes for manufacturing optoelectronic components, in particular optical fiber connectors, such as ferrules and split sleeves.

Conventional Stamping Process

Figure 1:
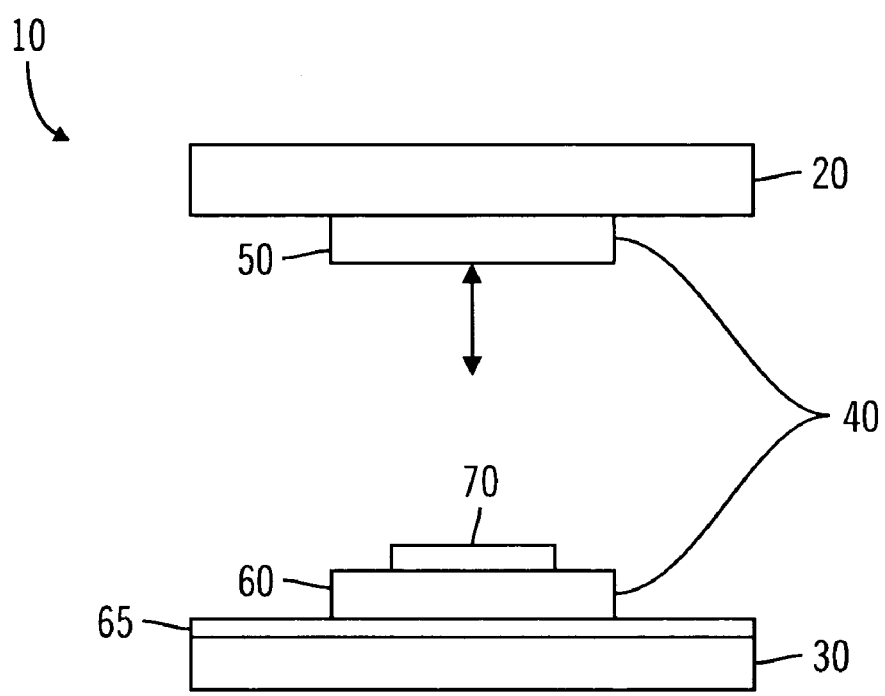
FIG. 1 is a schematic drawing illustrating a conventional stamping press.

For the sake of completeness, it is instructive to briefly describe a conventional stamping process. Stamping is a fabrication process that presses a work piece, such as a metal strip, between a die set assembly into a predetermined shape or pattern. Stamping presses and stamping dies are tools used in the stamping process. FIG. 1 is a schematic drawing illustrating a conventional stamping press 10. The stamping press 10 includes a press ram 20 and a press bed 30. The press ram 20 provides the necessary force to stamp a work piece by moving the components of the die set assembly relative to each other. The arrow shows the stroke action of the press ram 20 moving up and down relative to the press bed 30. However, the press ram can have other stroke action directions (not shown). A die set assembly 40, located between the press ram 20 and the press bed 30, is the tooling used to produce the stamped parts. The die set assembly 40 includes a punch 50, structurally coupled to the press ram 20, and a complementary die 60, attached to the press bed 30, or vice-versa. The stamping press 10 can include a bolster plate 65 attached to the top of the press bed 30 for attaching the die 60 to the press bed 30. The punch 50 and die 60 are aligned with each other such that as the press ram 20 moves towards the press bed 30, the punch 50 and die 60 work in a complementary fashion to implement a desired operation in the work piece.

In a stamping operation, a work piece 70 is positioned between the punch 50 and die 60. When the press 10 is actuated, the press ram 20 moves the punch 50 towards the die 60. The punch is guided to the die by guideposts and bushings (not shown) and the press ram 20. As the punch 50 and die 60 come together, the work piece 70 located between the punch 50 and die 60 is stamped. The die set assembly can perform various operations on the work piece, such as cutting and forming operations like punching, drawing, bending, flanging and hemming.

Several potential conditions could affect misalignment of the punch 50 and die 60. The press could become misaligned. Because the punch 50 is structurally coupled to the ram 20, the alignment of the punch 50 with the die 60 is also affected by the misalignment of the ram 20. Also, the bushings could wear over time, and the clearance between the bushings and guideposts would increase, resulting in misalignment of the punch and die.

U.S. Pat. No. 6,311,597 B1 discloses a complex stamping system design using a stripper, as a guidepost, and a die nest as a guide bushing. The die bushing indirectly guides a punch to a die via directly guiding a punch assembly supporting the punch. The punch assembly comprises the punch mounted to a punch shoe, and a stripper guidepost, having a ball bearing cage, mounted to the punch shoe. The die nest guides the stripper guidepost, and therefore indirectly guides the punch.

This complex design is prone to misalignment of the punch and die. In order for the punch to be in alignment with the die, it is critical for the punch to be mounted in alignment to the punch shoe and for the stripper to be mounted in alignment to the punch shoe. Any misalignment in assembling any of these components will result in misalignment of the punch and die. Also, this design employs at least one moving component in guiding the punch to the die, which can increase the potential for misalignment. The punch assembly moves within the die nest to guide the punch to the die. Any slight off-center movement of the punch assembly within the die nest will result in misalignment of the punch relative to the die. By using the ball bearing cage in the design, the potential for misalignment is further compounded. By its very nature, the ball bearings permit off-center movement of the stripper within the die nest, resulting in potential misalignment of the punch and die.

Tolerance Defined

As stated, the stamping system and process of the present invention is capable of producing parts with a "six sigma" geometrical tolerance band of 1,000 nm. Statistically, this means that at most only 3.4 parts per million will not meet dimensional requirements defined by the 1,000 nm tolerance band. For a normal distribution, to achieve a six sigma process, the standard deviation of the complete process must be less than or equal to 83 nm [(1000 nm/2)/6=83 nm], provided the mean of the process remains constant. In practice, an allowance must be made to accommodate shifts in the process mean. For the case where the shift in process mean of ±1.5*sigma is accommodated, the maximum standard deviation is reduced to 67 nm [(1000 nm/2)/7.5=67 nm]. Again, assuming normal statistics, to achieve this in a multistage process with n precision stages, each of the n-stages must have sigma/n^0.5. So if n=4 in this example, then sigma (per stage) is less than or equal to 33 nm.

Stamping System Overview

Figure 2:
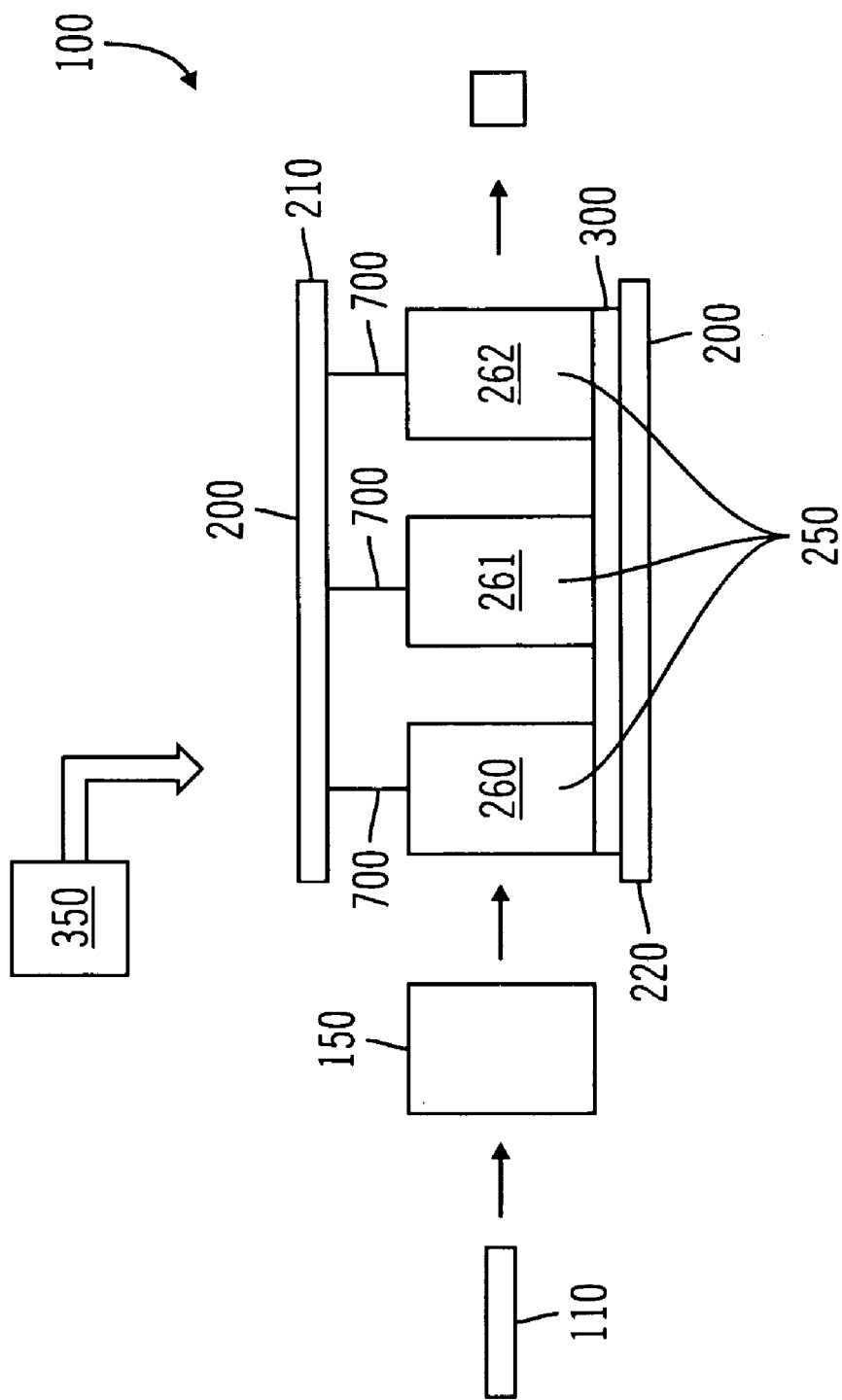
FIG. 2 is a schematic drawing illustrating a system for stamping parts having tolerances below 1,000 nm in accordance with one embodiment of the present invention.

FIG. 2 is a schematic drawing illustrating a system 100 for stamping optoelectronic components having tolerances below 1,000 nm in accordance with one embodiment of the present invention. The stamping system 100 includes means for in-line machining stock material 150, a stamping press 200, one or a progression of stamping stations 250, and a stamping station locating subplate 300.

In-Line Stock Machining

The stamping system 100 can include means 150 for in-line machining of stock material 110 into work pieces having predetermined dimensions and surface quality. For example, Moore Nanotechnology Systems has developed machine tools employing liquid cooled, oil hydrostatic bearings that have a programming resolution of 10 nm, motion accuracy of 50 nm and feedback resolution of 8.6 nm. These machine tools can be adapted to in-line machine the stock material 110 as it is dispensed from the un-coiler prior to it entering the stamping stations 250. This assures that when the stock material or work piece enters the stamping stations 250 it will be registered in each stamping station with the sub-micron precision necessary to produce optoelectronic components having tolerances below 1,000 nm.

Stamping Press

The stamping system 100 includes the stamping press or a custom-made high-speed energy source 200 for powering the stamping stations 250. The stamping press 200 can be any conventional stamping presses well known in the art (e.g. hydraulic, electromechanical, etc . . . ), which can support and provide the stamping stations 250 with the necessary force to perform the particular stamping operation. The stamping press 200 includes a press ram 210 and a press bed 220. As discussed more fully below, the stamping stations 250 are located between the press ram 210 and the press bed 220. The press bed 220 supports the stamping stations 250, and the press ram 210 delivers the necessary force to the stamping stations 250 to perform the stamping operations. It is well known that stamping presses can have stroke actions at speeds in excess of 1,000 strokes per minute (SPM). Additionally, the stamping system can include more than one stamping press to power the stamping stations.

Stamping Station—First Embodiment

Figure 3A:
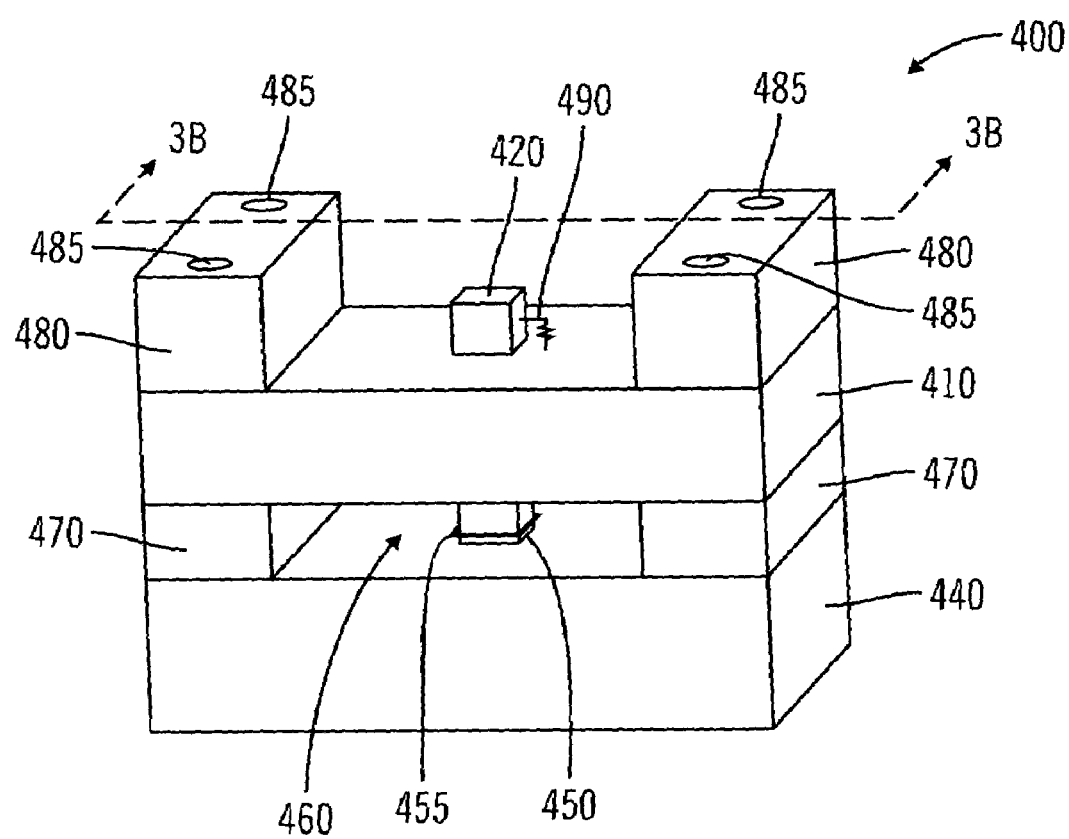
FIG. 3a is a perspective view of a stamping station in accordance with one embodiment of the present invention.
Figure 3B:
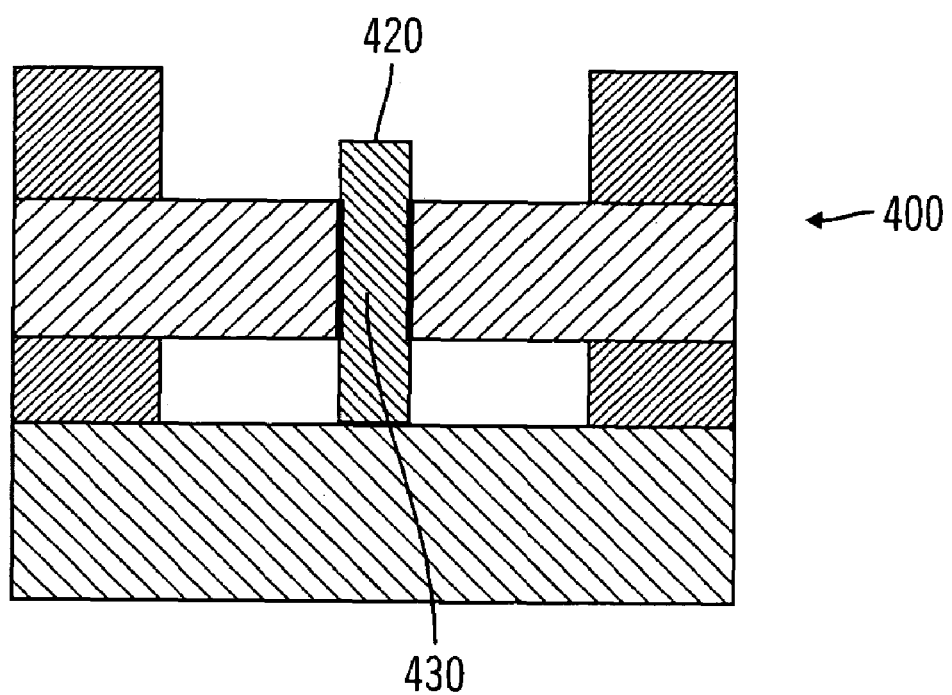

FIG. 3a is a perspective view of a stamping station 400 in accordance with one embodiment of the present invention. FIG. 3b is a sectional view of the stamping station taken along line 3b-3b shown in FIG. 3a. The stamping station 400 includes structure for supporting the die set assembly and for directly guiding the punch to the die. The stamping station 400 includes a stationary punch holder plate 410, for supporting a punch 420, and a die holder plate 440, for supporting a die 450. The punch holder plate 410 functions to align and directly guide the punch 420 to the die 450. The punch holder plate 410 has a shaft 430 sized and shaped to slidably receive the punch 420 and to guide the punch 420 to the die 450. The shaft 430 allows the punch 420 to translate and penetrate through the punch holder plate 410, in slidable contact with the shaft 430. The shaft 430 aligns the punch 420 with the die 450, guiding the punch 420 to a work piece 455 and the die 450. The die holder plate 440 also facilitates aligning the die 450 with the punch 420. The die 450 is fixedly aligned on the die holder plate 440 in a manner whereby as the punch 420 penetrates through the shaft 430 towards the die holder plate 440 the punch 420 approaches the die 450 in a complementary fashion to operate on the work piece 455.

A workspace 460 is defined between the punch and die holder plates 410 and 440 by providing spacers 470 between the plates 410 and 440. The workspace 460 is an area where the stamping operations occur. The work piece 455 is inserted into the workspace 460 where it is stamped to perform a desired operation on the work piece 455; e.g., to form a desired shape of a part. The workspace 460 is of sufficient area to accommodate the punch 420 and the die 450, the work piece, and the final stamped part. One skilled in the art can recognize that the dimensions of the spacers 470 can be varied, particularly the thickness of the spacers 470, so that the desired dimensions of the workspace 460 can be provided.

The stamping station 400 includes a stop block 480 for providing a safety stop for the press ram 210 (shown in FIG. 2). The stop block 480 is disposed between the press ram 210 and the top surface of the punch holder plate 410. As the press ram 210 actuates towards the station 400, the stop block 480 contacts with the press ram 210 to inhibit further penetration of the punch 420 into the stamping station 400. The stop block 480 controls the depth of penetration of the punch 420 into the stamping station 400. The penetration depth can be controlled by varying the thickness of the stop block 480. One skilled in the art can recognize that the stop block 480 can be made from any material of sufficient hardness to withstand repeated impact force from the press ram 210. Furthermore, the stop block 480 can have any configuration that will allow the stop block 480 to control the depth of penetration of the punch 420.

The punch 420 can be coupled to springs 490 or other biasing means for returning the punch 420 to the open position. As the punch 420 is moved towards the die 450, the springs 490 bias. Once the force of the press ram 210 is removed, the springs 490 move the punch 420 away from the die 450.

In assembling the stamping station 400, the punch holder plate 410 is mounted on the die holder plate 440, with the spacers 470 positioned between the plates 410 and 440. The stop block 480 is then mounted on the top surface of the punch holder plate 410. Fasteners well known in the art can be used to fasten the components of the stamping station 400 together. For example, bores 485 can be provided to receive bolts (not shown) to fasten the components of the stamping station 400 together. When fastened together, the components of the stamping station 400 assemble into a unitary structure.

Stamping Station—Second Embodiment

Figure 4:
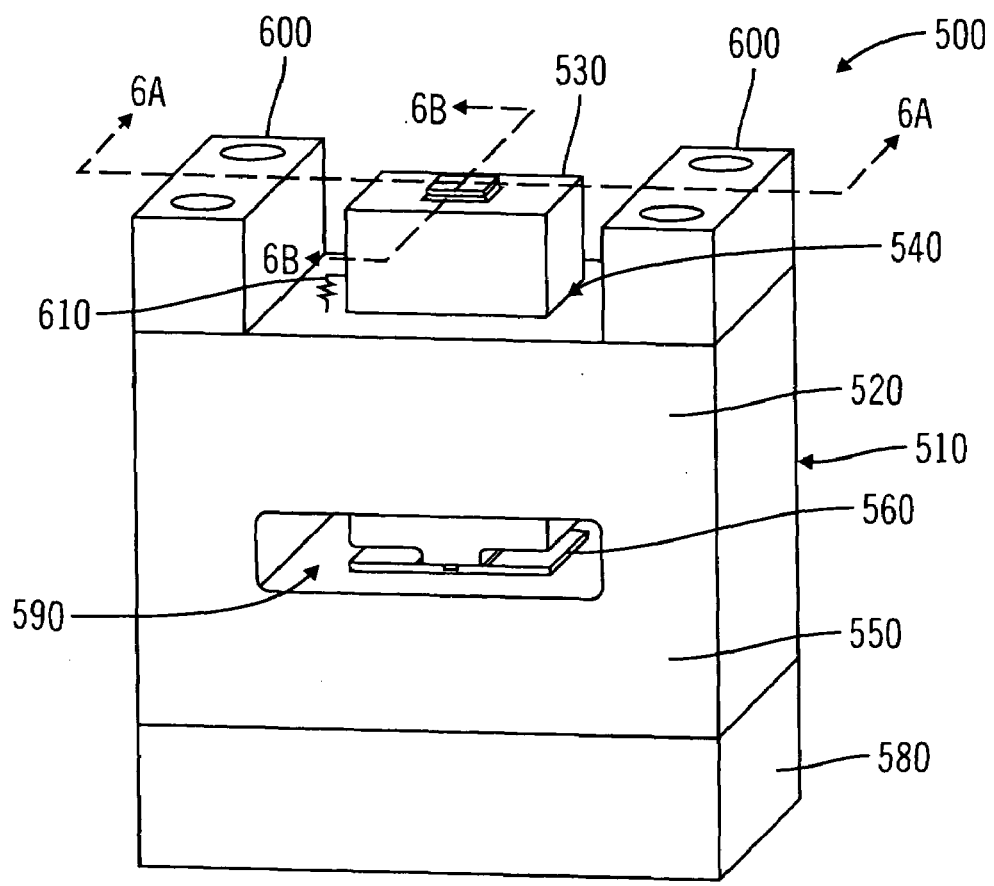
FIG. 4 is a perspective view of a stamping station in accordance with another embodiment of the present invention.
Figure 5:
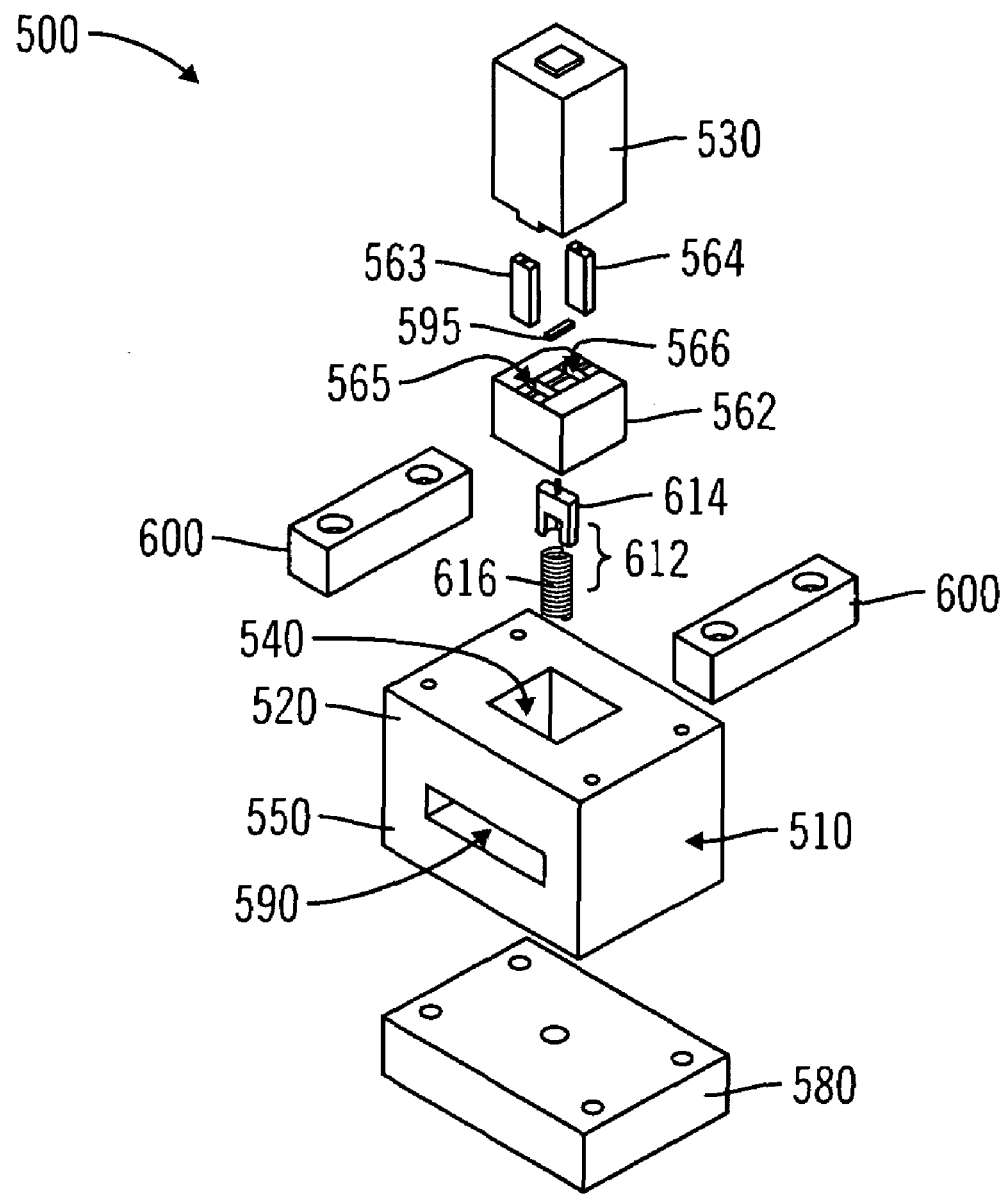
FIG. 5 is an assembly view of the stamping station shown in FIG. 4.
Figure 6A:
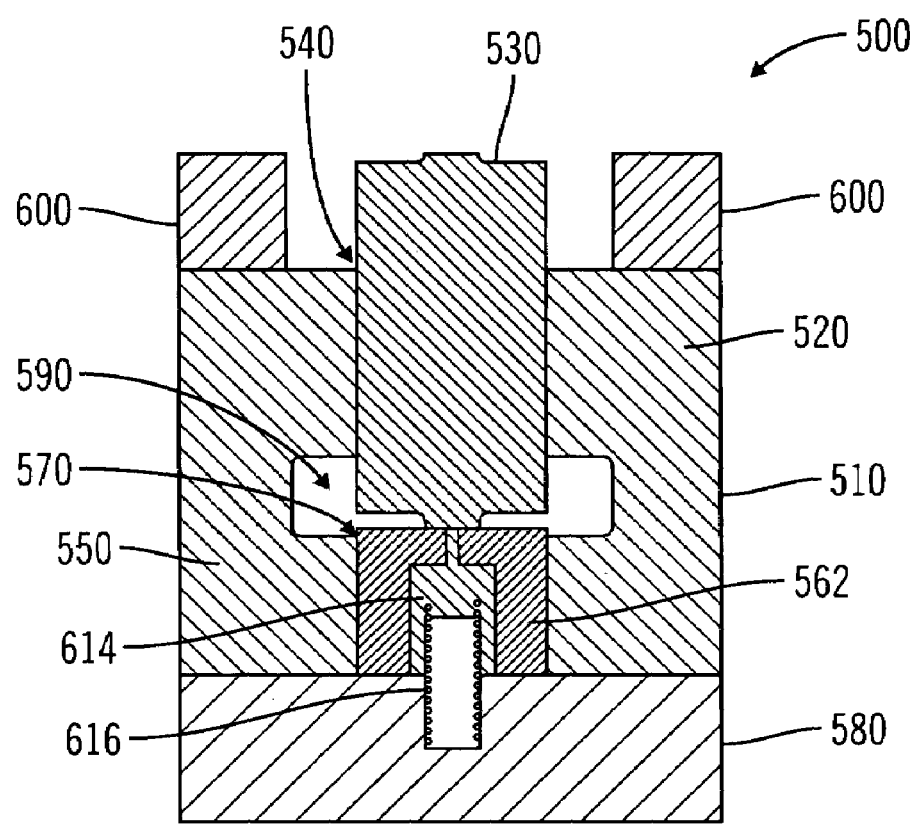
Figure 6B:
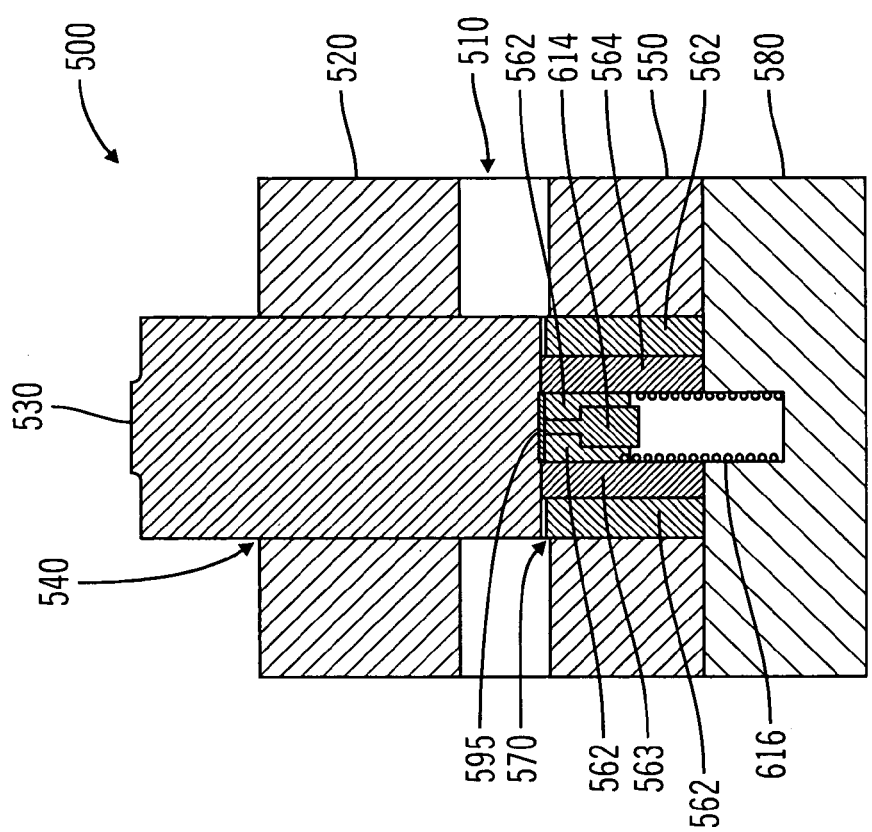
FIG. 6b is a sectional view of the stamping station taken along line 6b-6b shown in FIG. 4.

FIG. 4 is a perspective view of a stamping station 500 in accordance with another embodiment of the present invention. FIG. 5 is an assembly view of the stamping station 500 shown in FIG. 4. FIGS. 6a and 6b are sectional views of the stamping station 500 shown in FIG. 4, taken along lines 6a-6a and 6b-6b respectively. The stamping station 500 includes a stationary, monolithic die set assembly holder structure 510 for supporting the die set assembly. The die set holder 510 includes a punch holder section 520 for supporting and guiding a punch 530. The punch holder section 520 has a shaft 540 sized and shaped to slidably receive and support the punch 530. The shaft 540 is shown in FIG. 6. The shaft 540 allows the punch 530 to translate and penetrate through the die set holder 510. The punch 530 slides in contact within the shaft 540. The shaft 540 facilitates aligning the punch 530 relative to the die, guiding the punch 530 to a work piece 595 (shown in FIG. 5) and the die. The die set holder 510 also includes a die holder section 550 for supporting a die 560. The die 560 includes die inserts 562, 563 and 564. The die inserts 563 and 564 nest within pockets 565 and 566, respectively. The die holder section 550 includes a pocket 570 (shown in FIGS. 6a and 6b) for nesting the die 560. The pocket 570 is sized and shaped to precisely receive and nest the die 560. A backup plate 580 is provided to secure the die 560 within the pocket 570. Once the die 560 is nested within the pocket 570, the backup plate 580 is secured to the bottom of the die set holder 510 to secure the die 560 within the pocket 570. The die 560 is fixedly aligned in the die holder section 550 in a manner whereby as the punch 530 penetrates through the shaft 540 towards the die 560, the punch 530 approaches the die 560 in a complementary fashion to operate on the work piece 595. A workspace 590 is defined between the punch and die holder sections 520 and 550. The workspace 590 is an area where stamping operations occur. The work piece 595 is inserted into the workspace 590 where it is stamped to perform a desired operation on the work piece 595. The workspace 590 is of sufficient area to accommodate the punch 530 and the die 560, the work piece 595, and the final stamped part (not shown).

The stamping station 500 includes a stop block 600 for providing a safety stop for the press ram 210 (shown in FIG. 2). The stop block 600 is located between the press ram 210 and the top surface of the die set holder 510. The stop block 600 controls the depth of penetration of the punch 530 into the stamping station 500. The punch 530 can be coupled to springs 610 or other biasing means for returning the punch 530 to an open position. As the punch 530 is moved towards the die 560, the springs 610 bias. Once the force of the press ram 210 is removed, the springs 610 move the punch 530 away from the die 560.

The stamping station 500 also includes an ejector 612 for ejecting the stamped part 595 from the die 560 after a stamping operation. The ejector 612 includes a lifter 614 and a spring 616 or other biasing means. As discussed more fully below, the ejector 612 is disposed within a hollowed portion of the die insert 562 such that the lifter 614 is capable of engaging the stamped part 595 through the hollowed out portion of the die insert 562.

In the embodiment of the stamping station 400 shown in FIG. 3, the punch and die holder plates 410 and 440 are assembled together to form a unitary structure for supporting the punch 420 and die 450. In the embodiment of the stamping station 500 shown in FIG. 4, the structures for supporting the punch 530 and die 560 are provided as a monolithic structure. The die set holder 510 becomes a more rigid and stable structure, which allows the die set holder 510 to more accurately guide the punch 530 to the die 560.

Stamping Station—Third Embodiment

Figure 8A:
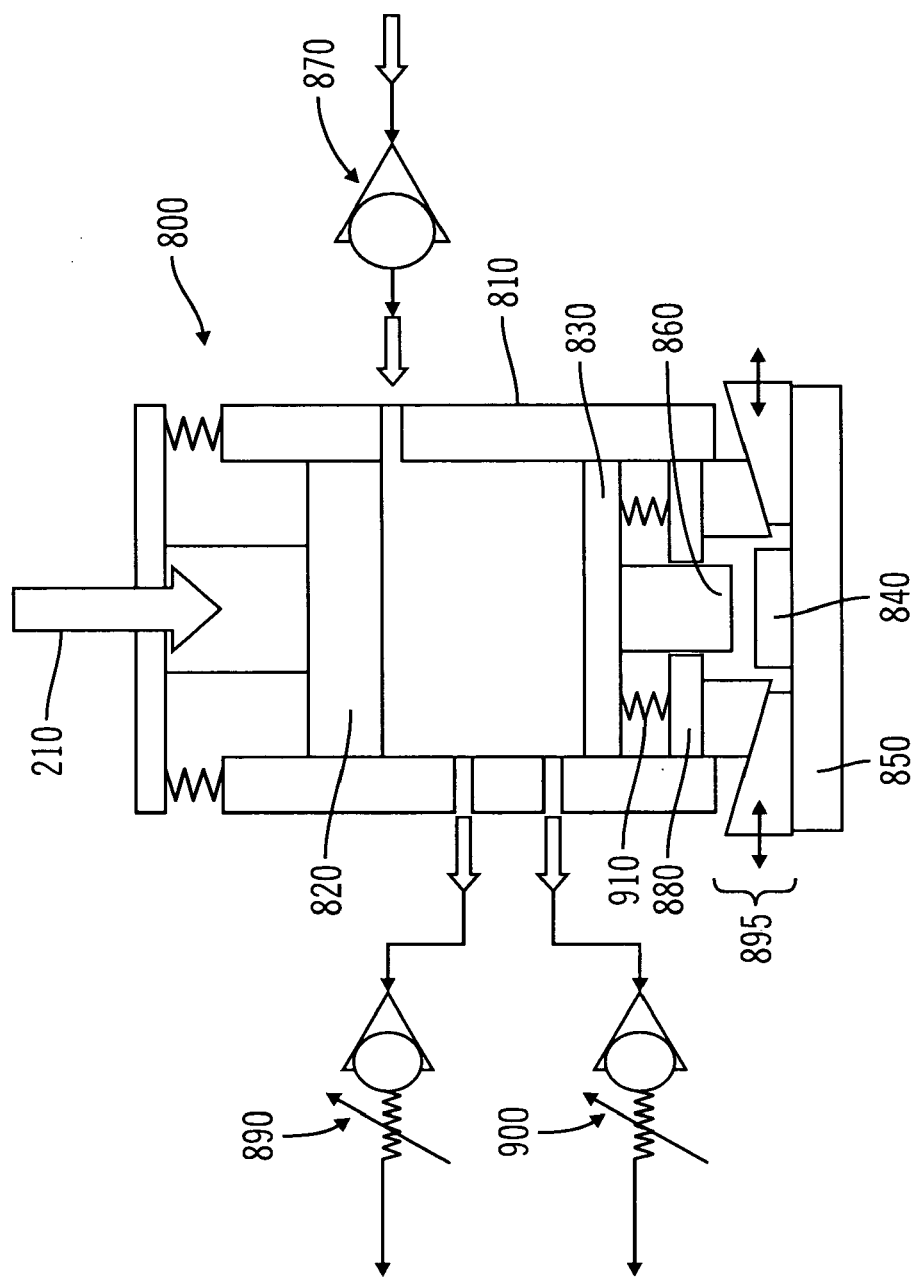
FIG. 8a is a schematic view of a stamping station incorporating a hydraulic interface system in accordance with another embodiment of the present invention.

FIG. 8a is a schematic view of a stamping station 800 in accordance with another embodiment of the present invention. The stamping station 800 includes a die holder plate 850, for supporting a die 840, and a shaft 810 for supporting and guiding a punch 860 to the die 840. The shaft 810 is sized and shaped to slidably receive and support the punch 860, allowing the punch 860 to translate longitudinally through the shaft 810 towards and away from the die 840. The shaft 810 facilitates alignment of the punch 860 with the die 840, guiding the punch 860 to the die 840. Adjustable mechanical stoppers 880 are located in the stroke path of the punch 860 for limiting the translation of the punch 860 towards the die 840. The punch 860 is provided with a catch 830 which can engage the stoppers 880 to limit further translation of the punch 860 towards the die 840. A spacer 895 is provided for adjusting the position of the mechanical stoppers 880 relative to the catch 830. The spacer 895 can be angle wedges and screws for micrometric adjustment of the spacers 895.

Interface System

Figure 7A:
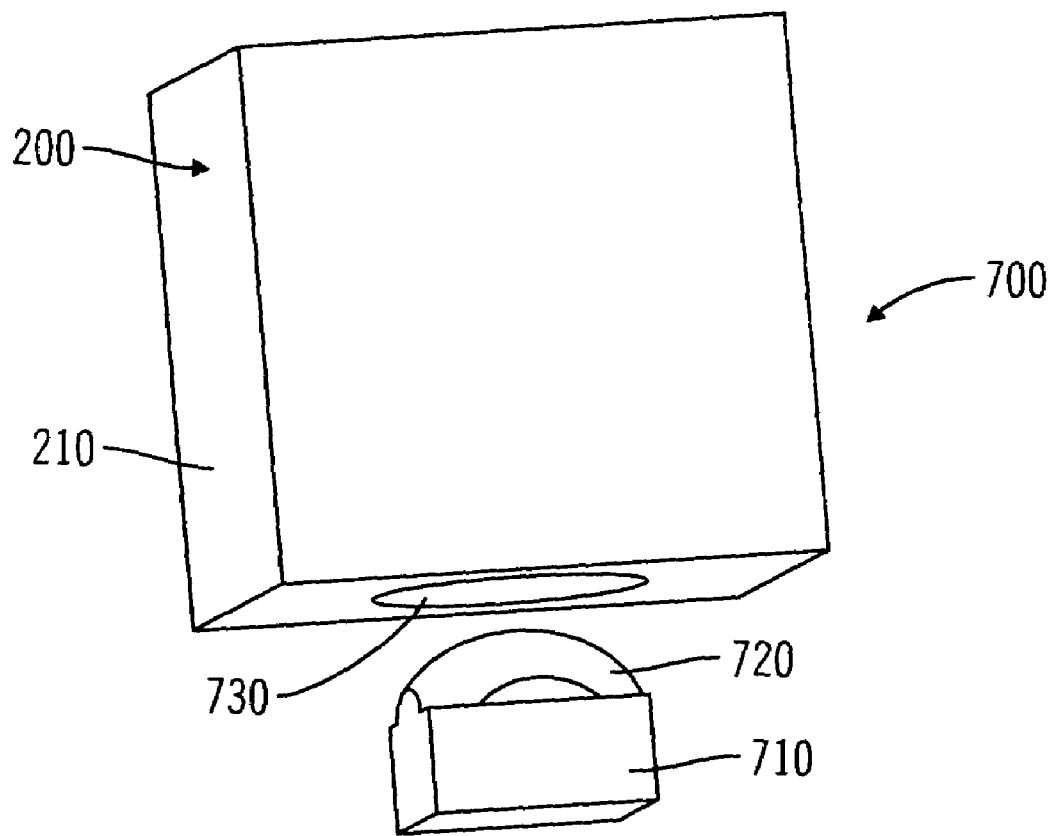
FIG. 7a is a simplified drawing of the interface system incorporated in the stamping system of the present invention.
Figure 7B:
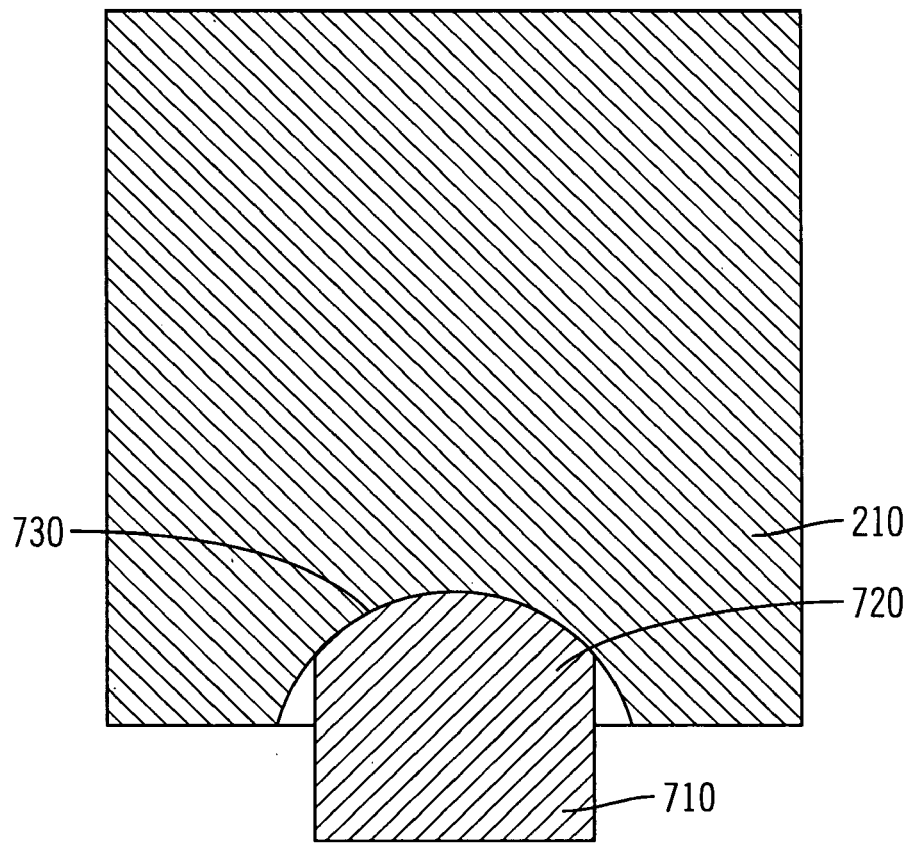
FIG. 7b is a sectional view illustrating the ball and socket of the interface system engaged.

The stamping system 100 includes an interface system 700 that mechanically interfaces the force from the press 200 to the stamping station 250 (substantially shown in FIG. 2), but structurally decoupling the press 200 from the stamping station 250. FIG. 7a is a simplified drawing of the interface system 700 incorporated in the stamping system 100 of the present invention. As mentioned above, the stamping press 200 is capable of delivering the necessary force to the stamping station 250 for the stamping operations. The force is delivered to the stamping station 250 via the interface system 700. In one embodiment, the interface system 700 is a ball and socket arrangement. A punch 710 is provided with a ball 720, and the press ram 210 is provided with a ball socket 730. Alternatively, an adapter plate (not shown), attachable to the press ram 210, can be provided with the ball socket. When the press ram 210 engages the punch 710, the ball 720 engages the ball socket 730. FIG. 7b illustrates the ball 720 engaged with the socket 730. The interface system 700 facilitates interfacing the force from the stamping press 200 to the stamping station 250. The interface system 700 also allows the stamping station 250 to be structurally decoupled from the stamping press 200. None of the stamping station 250 components are directly fixed or bolted to the press ram 210 in any way, thus not being affected by the relative inaccuracies of the press 200. Conventional stamping presses are by nature not built with tight tolerances. Further, high-speed processes operating under high forces tend to introduce vibrations and dimensional variability. By structurally decoupling the press 200 from the stamping stations 250, the dimensional variability of the press 200 is isolated from the ultra-precise stamping stations 250 and the die set assembly inserts. The press 200 can be simply a high speed, repeatable source of energy configured with relatively loose tolerances delivering forces to the ultra precise tools and dies at the stamping stations 250. It should be known to one skilled in the art that the ball and socket arrangement can be reversed, such that the punch is provided with the socket joint and the press ram is provided with the ball joint.

Referring to FIG. 8a, in an alternate embodiment, the system 100 can include a hydraulic interface system for interfacing the force of the press with the stamping station 800. The interface system includes an actuator plate 820 disposed within the shaft 810, at an end between the press ram and the punch holder plate. The actuator plate 820 is also capable of translating longitudinally within the shaft. The shaft 810 is provided with a valve 870 located between the actuator plate 820 and the punch holder plate 830 for providing the shaft 810 with low-pressure hydraulic fluid.

In operation, the shaft 810 is supplied with low-pressure hydraulic fluid via the valve 870. The press ram 210 pushes on the actuator plate 820 through the shaft 810 until the actuator plate 820 closes the valve 870. Once the valve 870 is closed, the fluid pressure in the shaft 810 increases to exert a force on the punch holder plate 830 to move the punch holder plate 830 and the punch 860. The force on the punch holder plate 830 is substantially uniform. The force vector is unidirectionally orthogonal to the face of the punch holder plate.

Figure 8B:
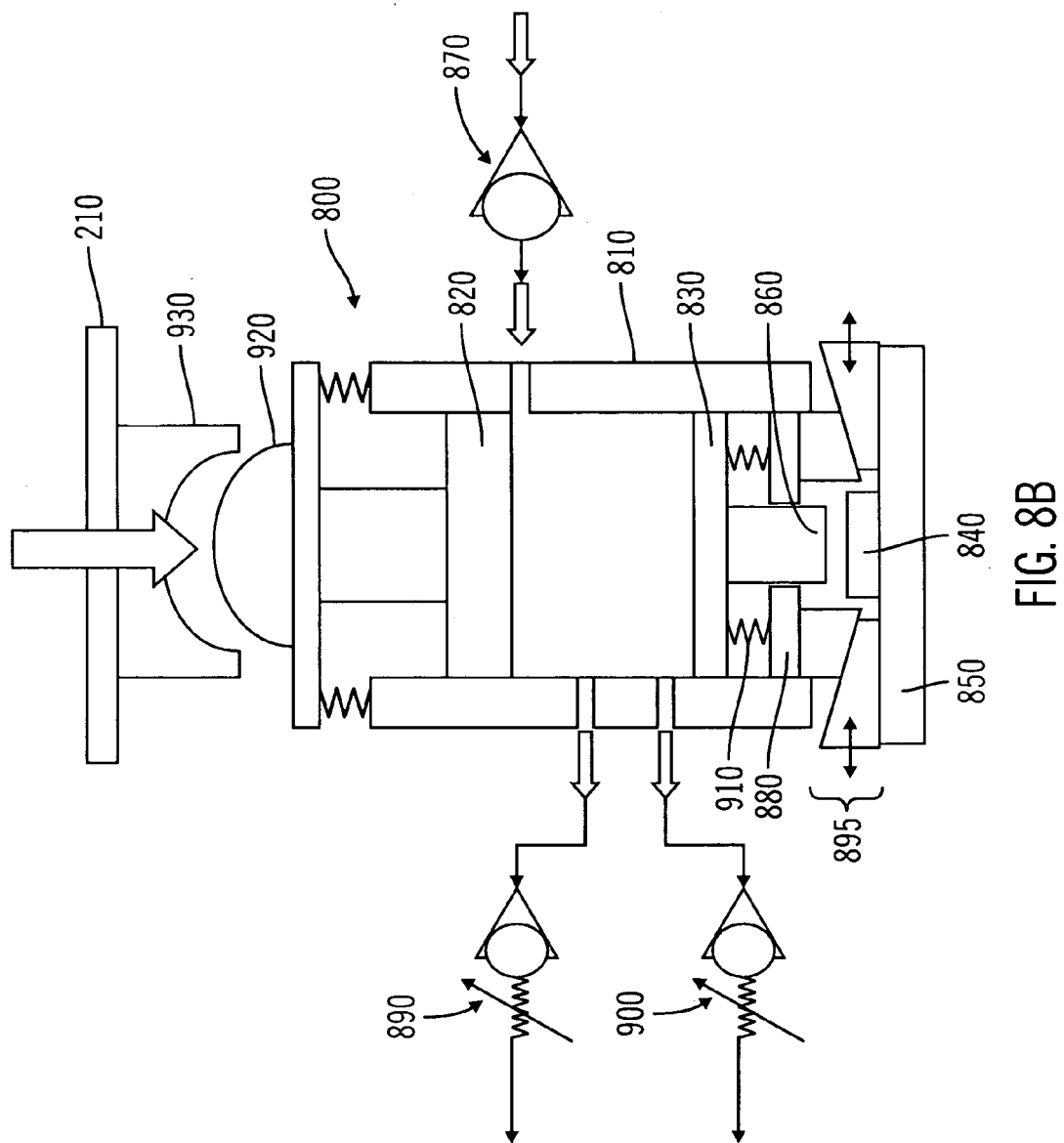
FIG. 8b is a schematic view of a stamping station incorporating a hydraulic interface system having a ball and socket arrangement in accordance with another embodiment of the present invention.

The hydraulic interface system can also include a ball and socket arrangement. FIG. 8b is a schematic view of the hydraulic interface system incorporating a ball and socket arrangement. The actuator plate 820 can be provided with a ball 920 and the press ram 210 can be provided with a socket 930, or vice versa. When the press ram 210 engages the actuator plate 820, the ball 920 engages the socket 930. The inclusion of the ball 920 and socket 920 provides further advantages of minimizing the structural stress on the stamping station components. Hydraulic actuation allows the direction of the force applied to the punch 860 to be independent from the direction of the force exerted by the press ram 210. The ball 920 and socket 930 arrangement reduces deformation introduced in the structure that holds the hydraulic mechanism, such as the actuator plate 820, and the punch 210 by shear and bending forces resulting from press misalignments.

The interface system facilitates interfacing the force from the stamping press 200 to the stamping station. The interface system also allows the stamping station to be structurally decoupled from the stamping press 200. Springs 910 coupled to the punch holder plate 830 can return the punch holder plate 830 away from the die 840.

Die Set Assembly

Figure 9B:
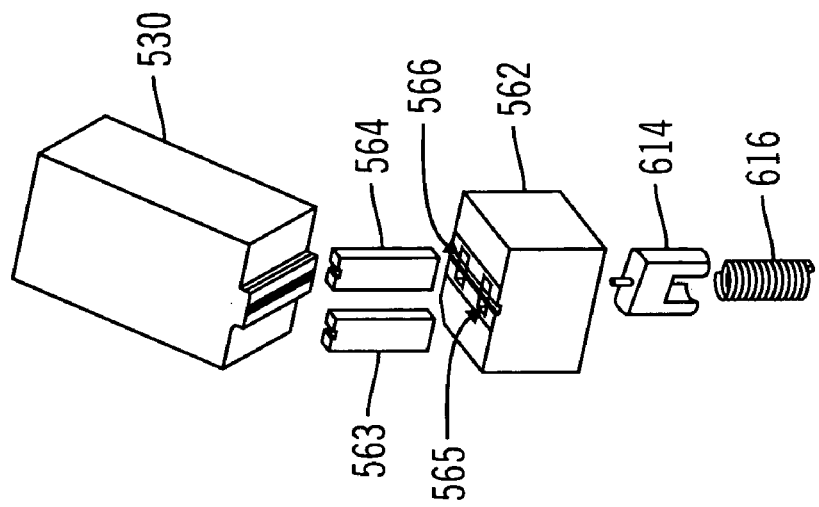
Figure 9A:
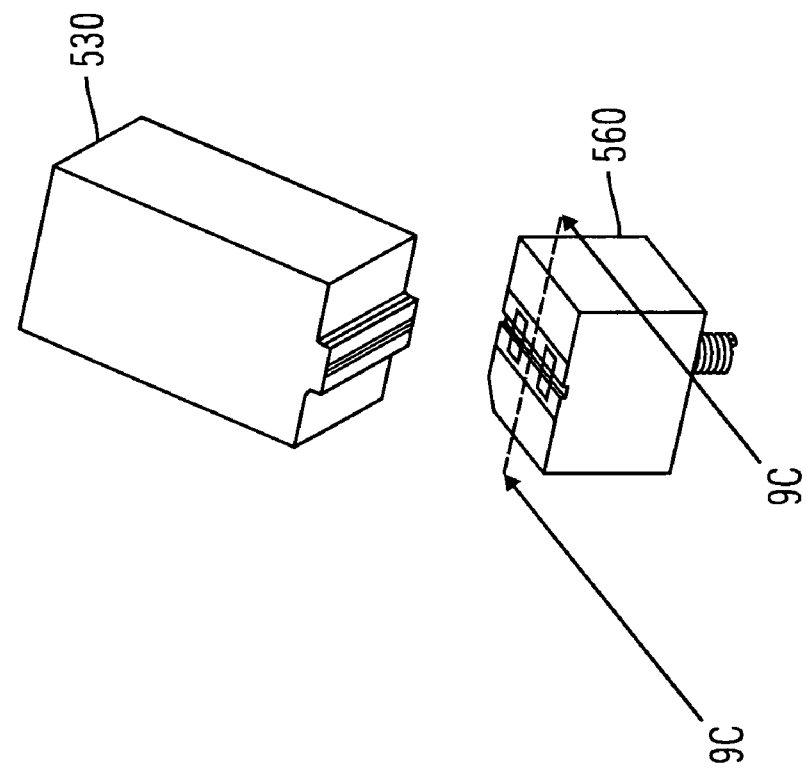
FIG. 9a is a perspective view of the punch and the die shown in FIGS. 4 and 5.
Figure 9C:
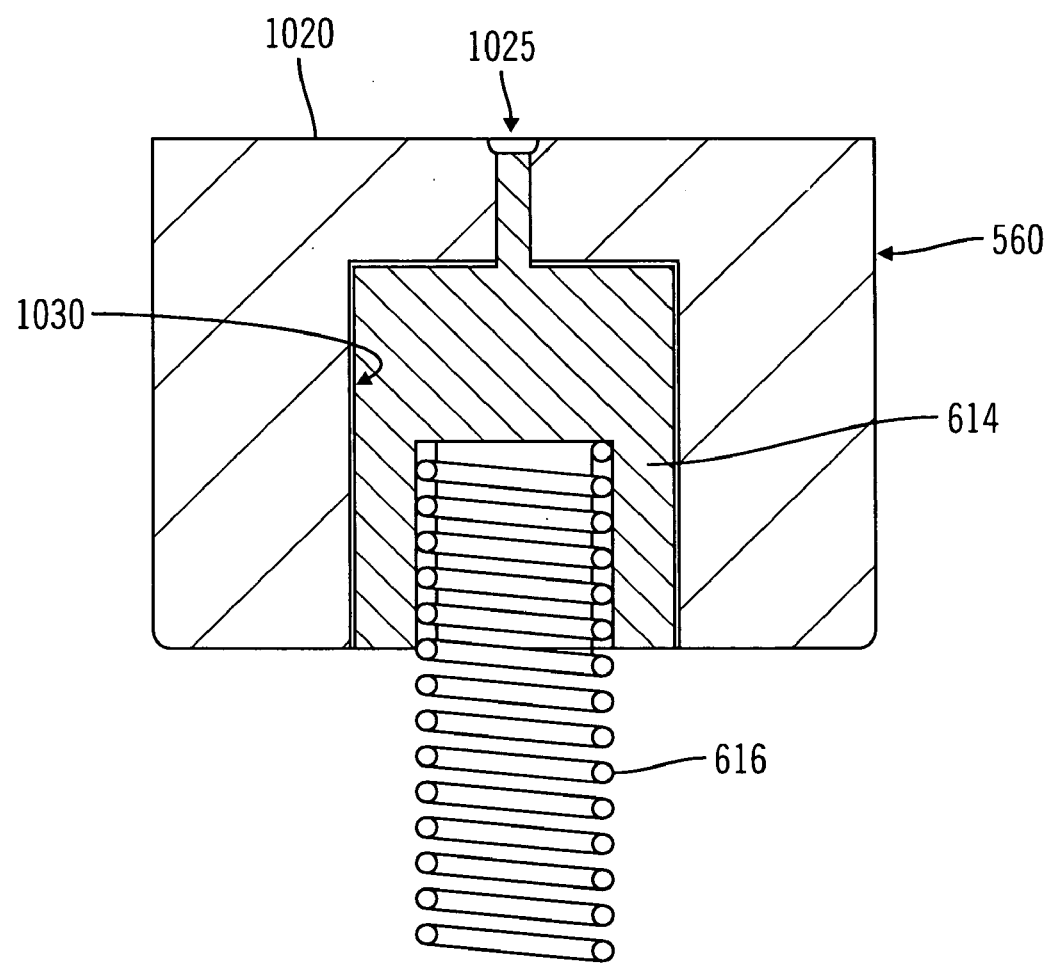

FIG. 9a is a perspective view of the punch 530 and the die 560 shown in FIGS. 4 and 5. The punch 530 and die 560 are comprised of blocks with formed surfaces, dowels, punches, cams, sensors and other items. These stamping tools are designed and built with tolerances below 500 nm. This allows the punch 530 and die 560 to be precisely located in the stamping stations 250. The punch 530 and the die 560 can be designed to be interchangeable between stamping stations. FIG. 9b is an exploded view of the punch 530 and the die 560 shown in FIG. 9a. The die 560 includes the die inserts 562, 563 and 564 (the die inserts 563 and 564 are not shown to scale). The die inserts 563 and 564 are nested within the pockets 565 and 566 of the die insert 562. FIG. 9c is a sectional view of the die 560 taken along line 9c-9c of FIG. 9a. The die 560 includes a formed surface 1020 and a hollowed-out portion 1030 defining an opening 1025 to the formed surface 1020. The lifter 614 and the spring 616 are disposed within the hollowed-out portion 1030. If the stamped part (not shown) is still attached to the die 560 after the stamping operation, the lifter 614 and the spring 616 are capable of ejecting the stamped part from the formed surface 1020. The lifter 614 is capable of engaging the stamped part through the opening 1025.

Progression

Figure 16:
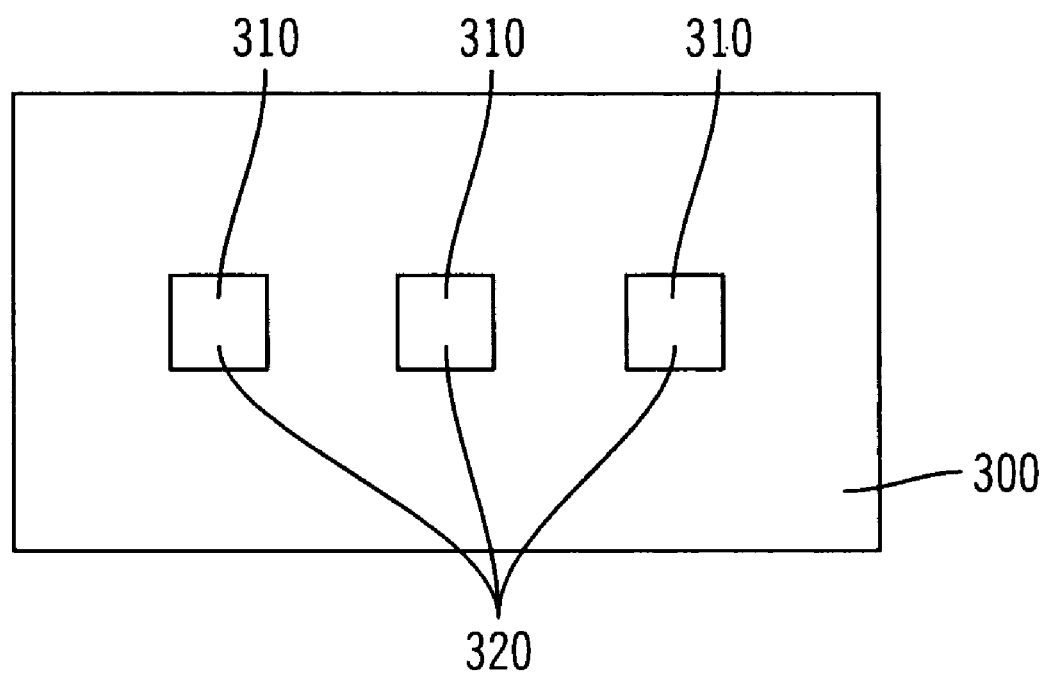
FIG. 16 is a top view of the locating sub-plate.

Referring back to FIG. 2, the stamping system 100 is capable of supporting a progression of stamping stations 250. For example, FIG. 2 shows the system 100 supporting three stamping stations, 260, 261 and 262. The progression of stamping stations 250 functions like a conventional progressive die, whereby each of the stamping stations 260, 261 and 263 performs a specific stamping operation. The progression of stamping stations 250 allows the system 100 to produce multiple features in the manufactured part simultaneously for every stroke of the punch press 200. The system 100 includes a locating subplate 300 disposed on the press bed 220 for precisely aligning the stamping stations 250 relative to each other. FIG. 16 is a top view of the locating subplate 300 incorporated in the present invention. The locating sub-plate 300 is provided with indexing features 310 for locating the stamping stations 250 relative to each other with sub-micron precision. In one embodiment, the indexing features 310 can be precisely machined grooves or slots 320 on one of the sub-plate surfaces. The grooves 320 are precisely sized and shaped to receive the base of the stamping stations 250. Once the stamping stations 250 are positioned within the grooves 320, the subplate 300 precisely locates the stamping stations 250 relative to each other with sub-micron precision. More than one locating subplate aligned with each other can be utilized depending upon the particular requirements of the application. The subplate, or if required, plates, 300 and its indexing features 310, can be fabricated using a precision machine tool, like for example the FV-500 manufactured by Moore Nanotechnology Systems, that can machine the subplate 300 flat and parallel with a surface finish of 10 nm of less.

Feedback Control

Referring back to FIG. 2, the system 100 can include an active feedback controller 350 for continuously monitoring and adjusting various system 100 parameters. For example, the controller 350 can be configured to monitor and adjust the amount of force delivered to the stamping station 800 shown in FIG. 8a. A working pressure relief valve 890 is provided for controlling the amount of force produced, and a stop pressure relief valve 900 is provided to minimize damage to the stamping station 800. The working pressure relief valve 890 can be a low flow valve with good accuracy on the pressure setting. The valve 890 is set to the pressure needed to produce the required force, which can be based on the formula (Hydraulic actuator surface*Pressure=Force). The stop pressure relief valve 900 can be a high flow valve with a closing histeresis, and is set to a significantly higher pressure than the pressure of the valve 890. The working pressure relief valve 890 and the stop pressure relief valve 900 can be a mechanical or electromechanical-type valve for faster response time. Once the punch 860 hits the work piece, fluid pressure builds to the forming pressure point and the working pressure relief valve opens 890. The working pressure is maintained. As the punch holder plate 830 hits the stoppers 880, pressure builds in the chamber 810 with substantially negligible displacement of the punch holder plate 830. The stop pressure relief valve 900 then opens and pressure drops. The press ram 210 starts traveling up and the stamping station 800 resets itself to starting conditions.

The controller 350 can incorporate various types of sensors well known in the art, such as mechanical, electrical, and optical sensors. The sensors can be incorporated in the die set assemblies, the work piece, and in other system components. The controller 350 can be configured to monitor the tolerances of the work piece and adjust parameters, such as alignment of the punch and die, alignment of the work piece relative to the die set assembly, stroke speed of the punch and the press ram, in response to the measured responses, so as to achieve the desired tolerances in the final part produced by the stamping system 100.

Design Considerations

Maintaining substantial alignment of the punch and die is an important consideration in producing parts having tolerances below 1000 nm. The design of the stamping stations facilitates substantial alignment of the punch and die by providing a simple and substantially rigid structure for guiding the punch to the die. In the embodiments of the stamping stations, the structures for guiding the punch to the die are stationary, and there is no moving component involved in guiding the punch to the die. The punch is directly guided to the die via the shaft. By minimizing the number of moving components involved in guiding the punch to the die, potential sources for misalignment are also minimized. Compared to the stamping system disclosed in U.S. Pat. No. 6,311,597 B1, which has at least one moving component in guiding the punch to the die (i.e., the punch assembly moving within the die nest), the system of the present invention is designed to better minimize the source of potential misalignment. Also, the rigidity of the stamping station facilitates alignment of the punch and die. The structures supporting the die set assembly are made from high strength materials, such as tungsten carbide, and are designed as a unitary structure (as shown in FIG. 3) or as a monolithic structure (as shown in FIG. 4). The punch holder structure is designed as a structure having sub-micron tolerances (e.g., 150 nm) and surface finishes (e.g., peak to valley surface roughness of 10 nm or less). As a result, the clearance between the shaft and the punch is substantially tight, allowing the shaft to rigidly support the punch. The sub-micron surface finishes of the shaft allows the punch to smoothly translates within the shaft, reducing wear on the punch and potential misalignment.

Structurally decoupling the press from the tooling also contributes to the stamping system being capable of producing parts having tolerances below 1000 nm. The interface system incorporated in the stamping system couples the force from the press with the punch. In the interface system shown in FIGS. 8a and 8b, the interface system further facilitates interfacing the force in a unidirectionally orthogonal direction along the punch holder plate. However, the interface system is structurally decoupled from the tooling. In doing so, the system substantially eliminates the influence of the inaccurate stamping press on the tooling. The press therefore can be of a type with poor tolerances.

Other design features of the stamping system 100 contribute to the system being capable of producing parts having tolerances below 1000 nm. The punch and die also have sub-micron tolerances (e.g., 150 nm) and surface finishes below 10 nm, for example. The exacting tolerances of these system components allow the punch and die to be substantially precisely located within the stamping stations and to be precisely aligned with each other. This allows the punch to precisely mate with the die. Additionally, the stock material may be machined to exacting tolerances before entering the stamping stations. This allows the work piece to be precisely located within the stamping stations during stamping operations.

Example of Parts

Figure 10A:
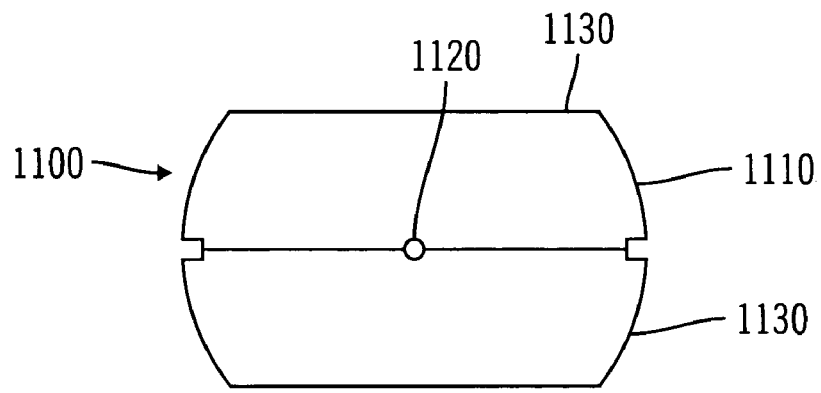
FIG. 10a is an end view of an optoelectronic assembly produced by the stamping system of the present invention.
Figure 10B:
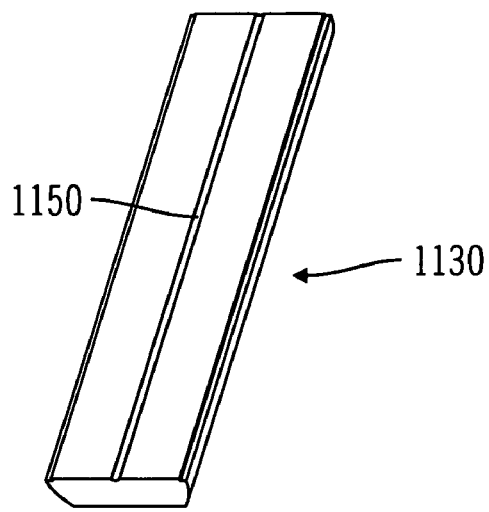
FIG. 10b is a perspective view of the half ferrule part stamped by the punch and die inserts (shown in FIG. 9a).
Figure 10C:
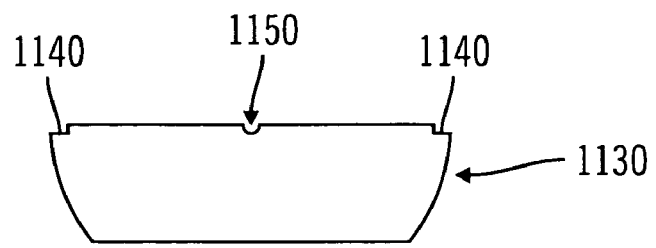
FIG. 10c is an end view of the ferrule half shown in FIG. 10b.

FIG. 10a is an end view of an optoelectronic assembly 1100 produced by the stamping system 100 of the present invention. The system has a plurality of stations in the progression, depending on design details and metrology considerations. FIG. 10a shows a ferrule 1110 securing an optical fiber end 1120. The ferrule 1110 is comprised of two identical ferrule halves 1130 assembled together. FIG. 10b is a perspective view of the half ferrule part 1130 stamped by the punch and die 530 and 560 (shown in FIG. 9a). FIG. 10c is an end view of the ferrule half 1130 shown in FIG. 10b. The ferrule design shown in FIGS. 10a-c has a partial semicircular end cross-section. However, the stamping system can also fabricate a ferrule with a full circular end cross-section (as shown in FIG. 11b). The punch and die 530 and 560 can be inserted in one of the plurality of stamping stations. Two of these ferrule halves 1130 can be produced from a single strip of stock material at a time. The ferrule halves 1130 are each provided with notches 1140 for assembling two ferrule halves 1130 together (e.g., by welding at the notches 1140). Each ferrule half 1130 also includes a groove 1150 for nesting the optical fiber end 1120. In the embodiment shown in FIGS. 10a-c, the ferrule dimensions are 2.5 mm or 1.25 mm in end cross-section diameter, and 10 mm in length with alignment grooves. It is understood, however, that the dimensions are by way of example only and that other dimensions are also possible. In another station, the two ferrule halves 1130 can be assembled and aligned with an optical fiber in preparation for laser welding. A StarWeld 20 laser welder manufactured by Rofin, Inc. is an example of a laser welder in which a laser pulse is delivered to the part to be welded. In addition to performing the welding function, the laser system can be employed to strip the coating from a fiber as well as properly preparing the fiber end face. When the two ferrule halves 1130 have been welded together at the notches 1140, the ferrule 1110 securely and precisely positions the end of the optical fiber 1120. The ferrule 1110 is capable of securing fibers having a diameter of 0.125 mm, for example.

Figure 11A:
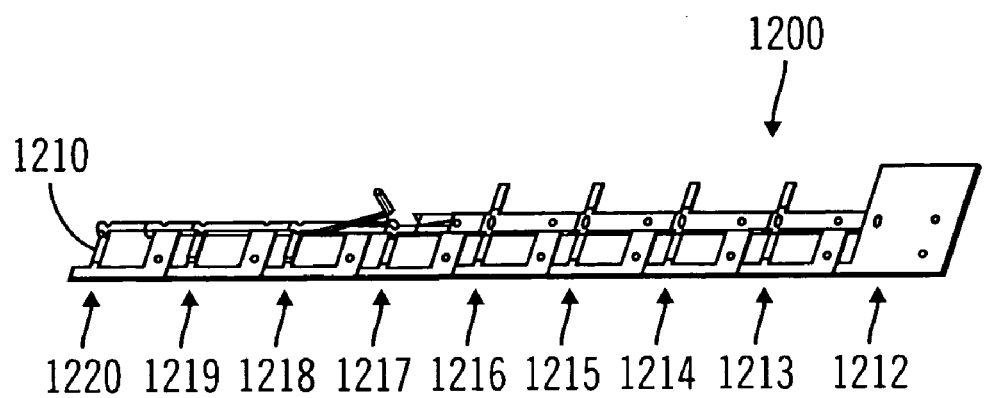
FIG. 11a illustrates a "strip layout" design to produce a coined and welded ferrule in a "two-up configuration."
Figure 11B:
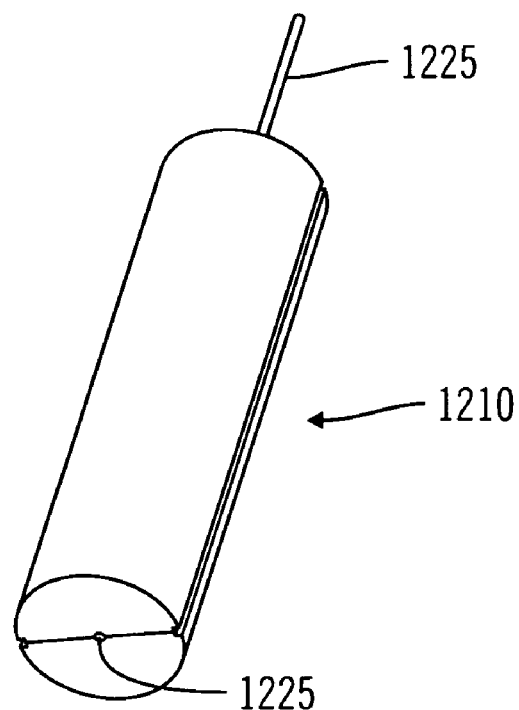

FIG. 11*a* illustrates a "two-up configuration strip layout" design 1200 to produce a coined and welded ferrule 1210. FIG. 11*b* is a perspective view of the final ferrule part 1210. The progression of the stamping process includes nine stations in series (e.g., refer to FIG. 2), stations 1212-1220 for example, and the progression is from station 1212 to station 1220. At stations 1212-1215, the work piece is sized and shaped. At station 1216, the groove is formed. At stations 1217-1220, a fiber is positioned on the formed groove and two ferrule halves are folded together. FIG. 11*b* shows a fiber 1225 positioned within the ferrule 1210. The ferrule 1210 is adapted for a split alignment sleeve having a circular cross-section (not shown). This coining process results in the assembled ferrule halves completely filling the construction circle of the split alignment sleeve. The split sleeve is part of a fiber optic connector adapter (not shown) used to make a demountable connection between two fibers (each fiber positioned within a ferrule 1210).

Figure 12A:
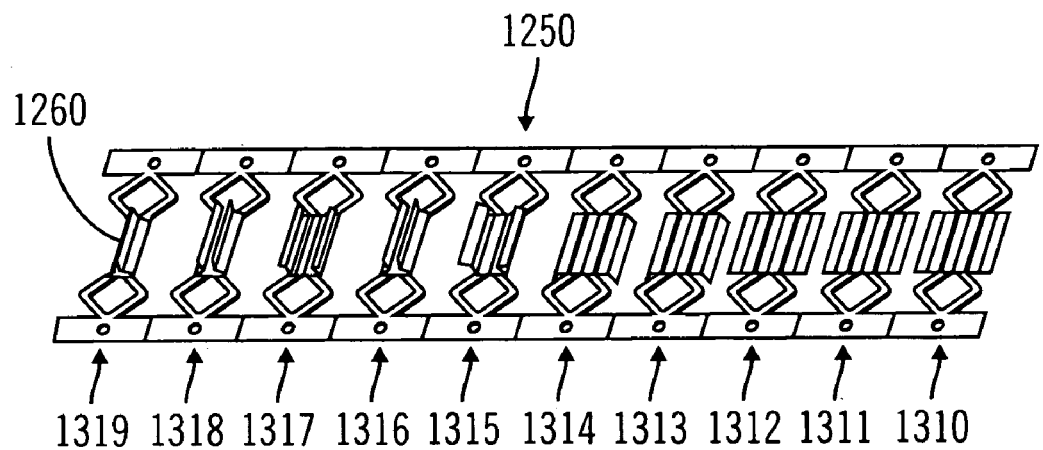
FIG. 12a illustrates a "strip layout" design to produce a star-shaped formed and tack-welded ferrule contained in a stamped split sleeve.
Figure 12B:
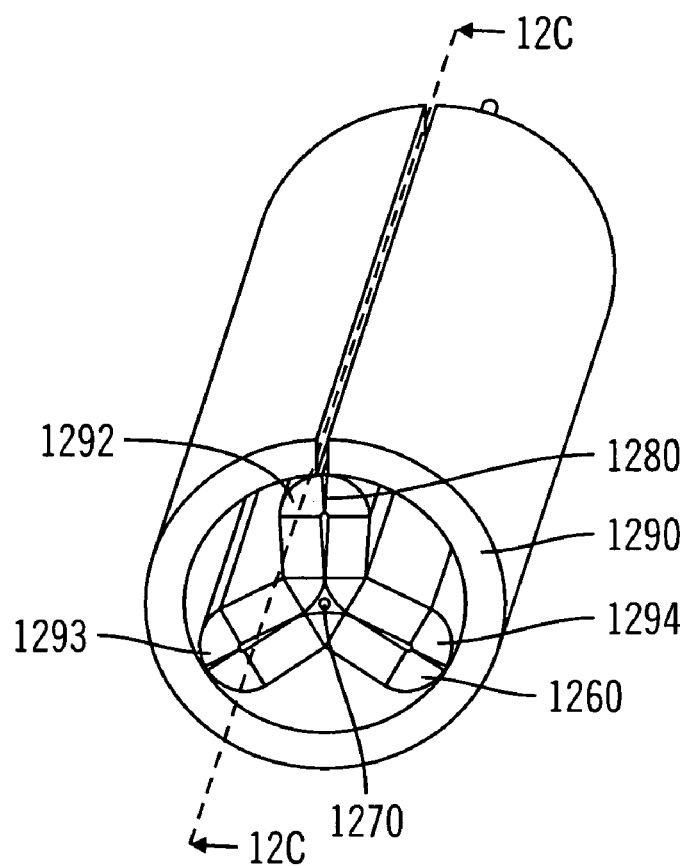
FIG. 12b is a perspective view of an assembly incorporating the star-shaped ferrule.
Figure 12C:
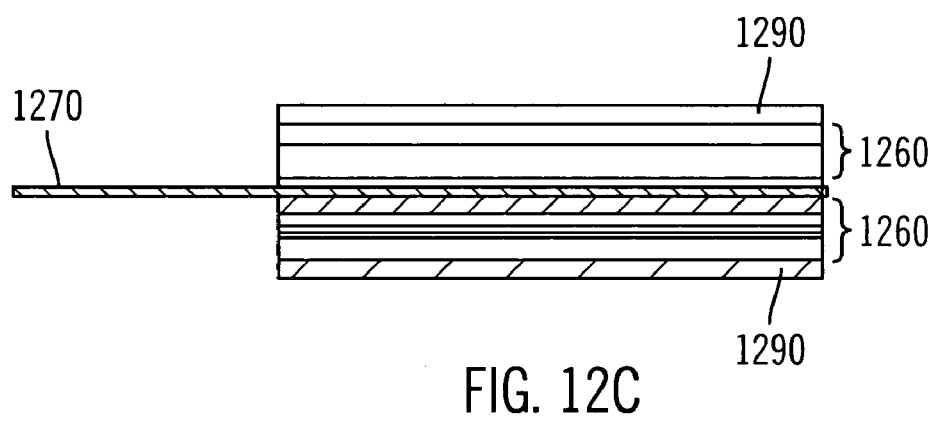
FIG. 12c is a sectional view of the assembly taken along line 12c-12c shown in FIG. 12b.

FIG. 12*a* illustrates a "strip layout" design 1250 to produce a star-shaped formed and tack-welded ferrule 1260. The progression of the stamping process includes 10 stations, stations 1310-1319 for example, and the progression is from station 1310 to station 1319. At stations 1310-1312, the work piece is formed and shaped. At stations 1313-1319, the work piece is folded into the star shape. FIG. 12*b* is a perspective view of an assembly incorporating the star-shaped ferrule 1260. FIG. 12*c* is a sectional view of the assembly taken along line 12*c*-12*c* shown in FIG. 12*b*. The ferrule 1260 is stamped using the forming process, whereby the star-shaped ferrule 1260 is formed, crimped on a fiber 1270 and tack welded closed at a point 1280. The ferrule 1260 is designed to precisely fit inside a split alignment sleeve 1290 to the sub-micron tolerance required to achieve low loss, fiber-to-fiber connection. The dimensions of this ferrule are 2.5 mm or 1.25 mm in end cross-section diameter, 10 mm in length with alignment grooves, and designed to accept a fiber of 0.125 mm diameter. It is understood, however, that the dimensions are by way of example only and that other dimensions are also possible. The ferrule has three points 1292, 1293, and 1294, but can be designed with any number of points including only two.

Figure 13:
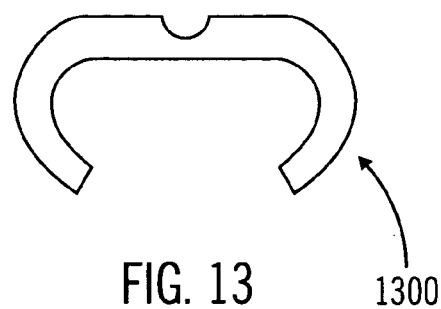
FIG. 13 is a cross-sectional end view a ferrule half manufactured by a coining and forming process.

The system can be adapted to produce ferrules using a combination of coining and forming processes. FIG. 13 is a cross-sectional end view a ferrule half 1300 manufactured by a coining and forming process. In this embodiment, the alignment groove is formed using a coining process while the radius of the ferrule half is formed. This design can be manufactured "two-up" and assembled using a laser welding process. It should be noted that, although shown as a partially complete circular end cross-section, the ferrule can be fully formed into a circular end cross-section and laser welded closed (not shown).

Figure 14:
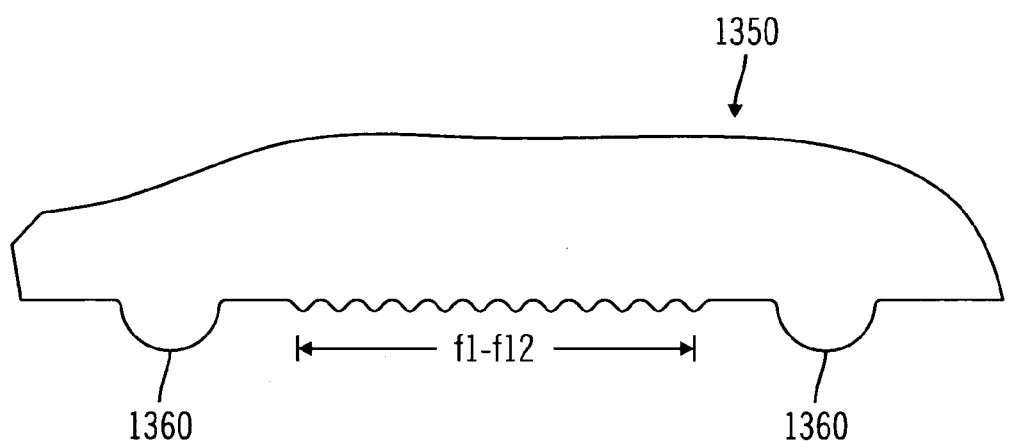
FIG. 14 is a cross-sectional view a multi-fiber ferrule punch used to coin a multi-fiber ferrule half.

The system 100 can be adapted to produce multi-fiber ferrules for the simultaneous connection of multiple fibers. FIG. 14 is a cross-sectional view a multi-fiber ferrule punch 1350 used to coin a multi-fiber ferrule half (not shown). Particularly, the punch 1350 is a 12-fiber ferrule punch. Two large semicircular protrusions 1360 form, when the ferrule halves are assembled, circular channels for guide pins that serve to align the fibers when two connectors are mated. The pins serve the same function as the single fiber split sleeves. The protrusions labeled f1 through f12 form, when the ferrule halves are assembled, the circular channels for individual fibers. There are 12 fibers in this example. The tolerances on the fiber alignment protrusions f1-f12 achieved on this particular punch are ±150 nm parallel to the surface and ±400 nm perpendicular to the surface of the punch 1350.

Stamping tools can be fabricated to exacting tolerances. The stamping station 400 shown in FIG. 3*a* is assembled from components fabricated to submicron tolerances and surface finishes. Because of the resultant quality of the punch holder plate 410, the die plate 440 and the spacers 470, the punch holder plate 410 and the die holder plate 440 were measured to be parallel to within 16 micro radians. With this degree of parallelism, punch to die misalignment is less than 200 nm.

Figure 17:
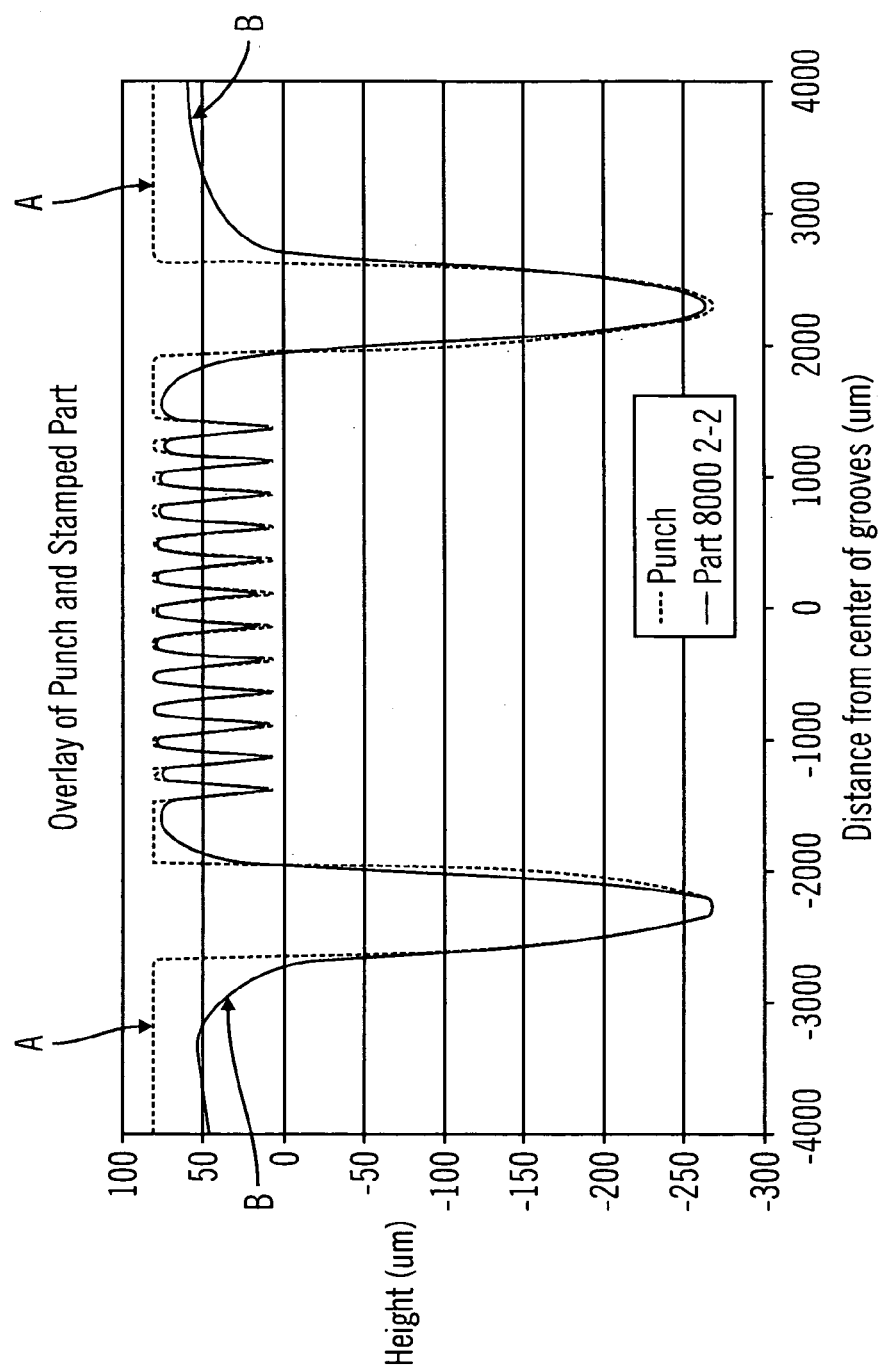
FIG. 17 is a graph showing a measured profile data of the 12-fiber punch overlaid with data obtained for a sample coined part.
Figure 18:
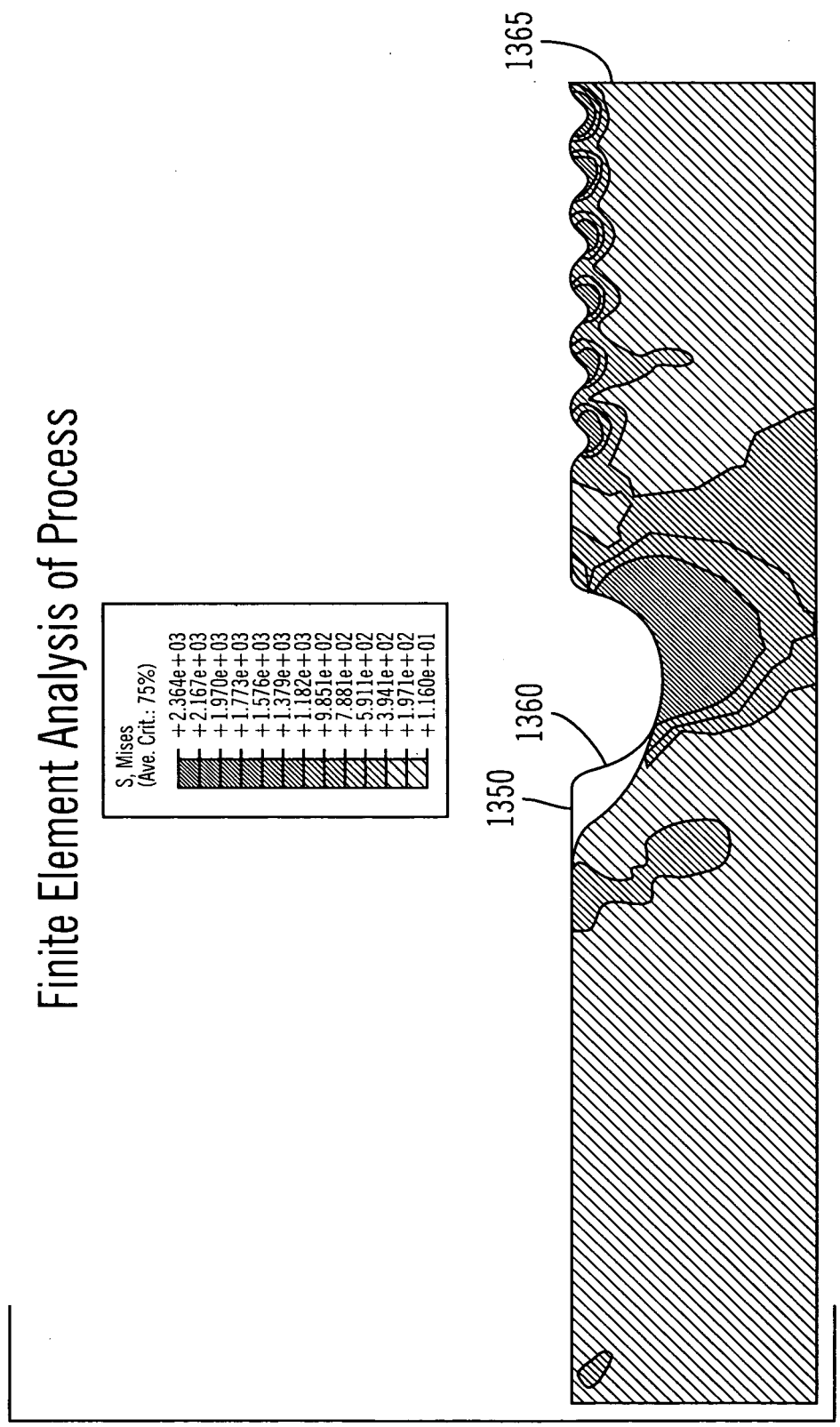
FIG. 18 is a schematic drawing showing a Finite Element Analysis (FEA) predicted filling of the 304 blank in an open die configuration.
Figure 19:
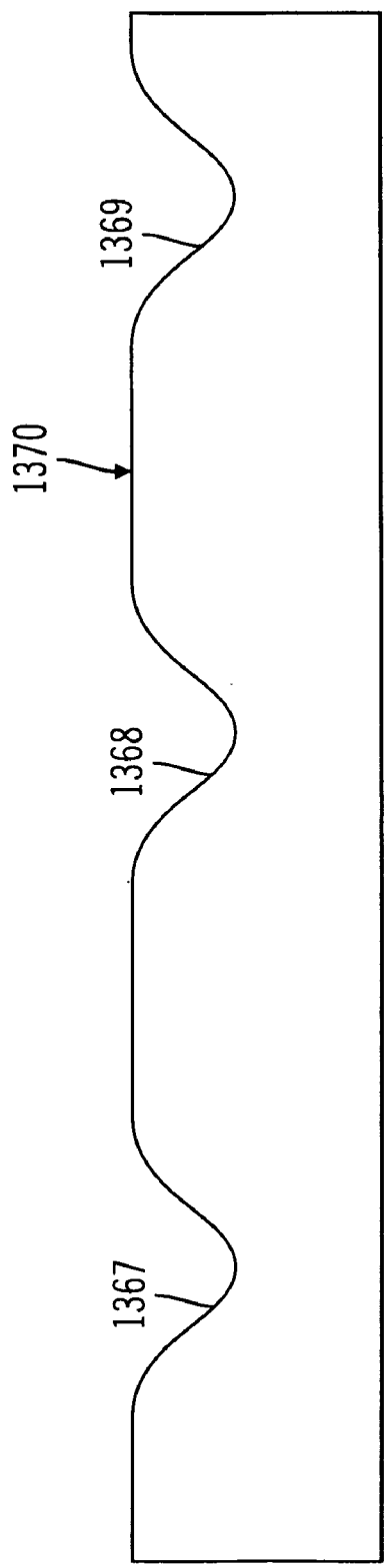
FIG. 19 is a photograph showing three fiber grooves of a coined 12-fiber ferrule sample.
Figure 20:
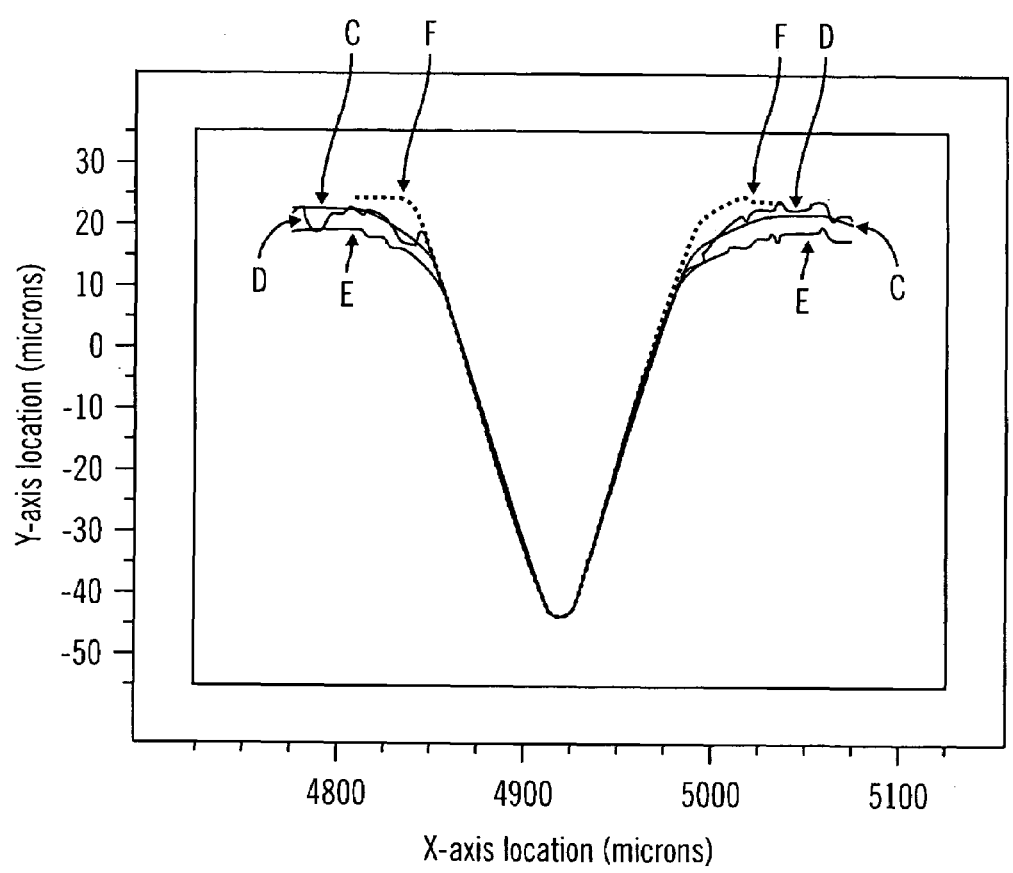
FIG. 20 is a graph illustrating the measured profile data of the same fiber groove from three 304 stainless steel samples and the measured profile data of that feature on the punch.
Figure 21:
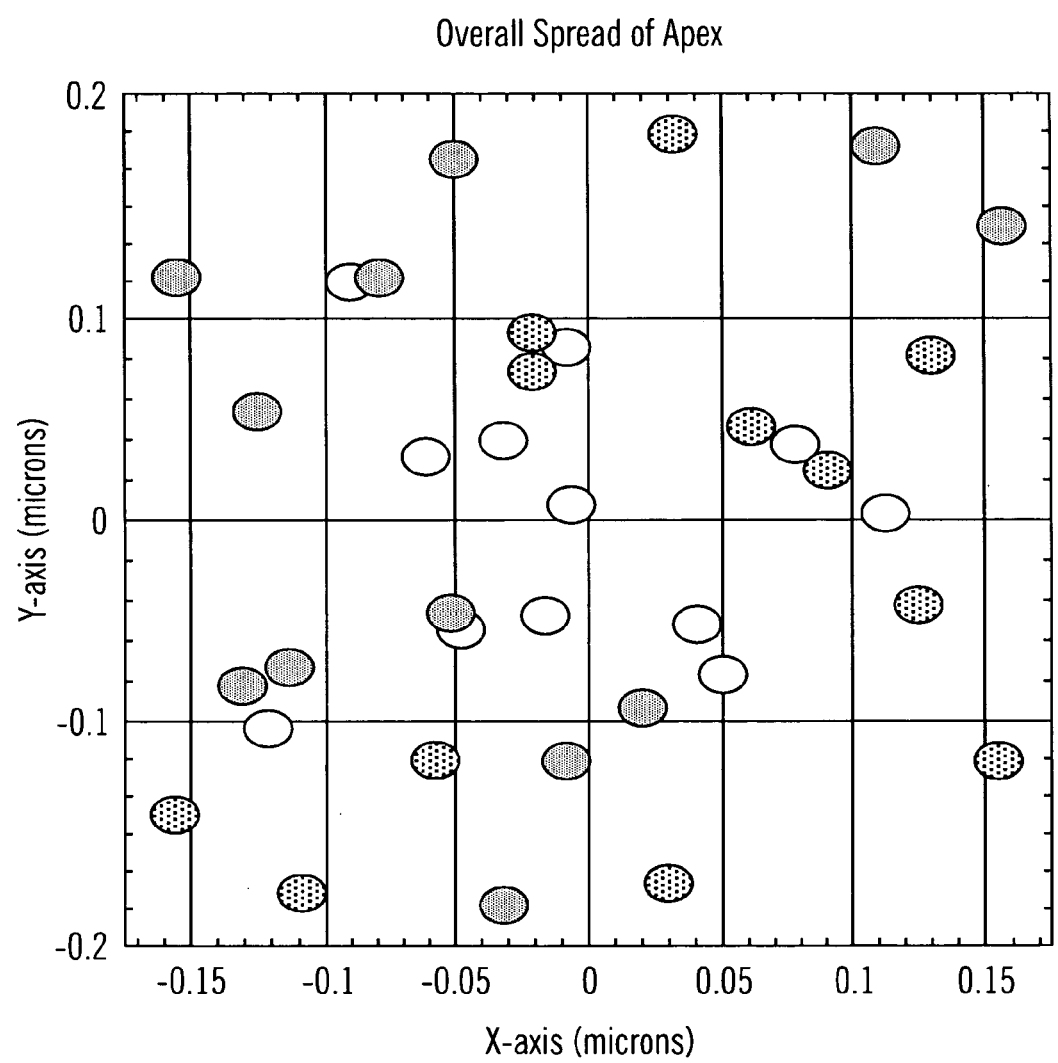
FIG. 21 is a graph illustrating the maximum variation of groove location relative to the mean location for three different sample stamped parts.

Stamping station 400, along with the 12-fiber punch 1350 (shown in FIG. 14), can be used in an open die configuration to coin multi-fiber ferrule halves in 304 stainless steel blanks whose dimensions are approximately 10×10× by 1 mm. FIG. 17 is a graph showing a measured profile data of the 12-fiber punch overlaid with data obtained for a coined 12-fiber part sample. Line A represents the measured profiled data of the punch 1350 and line B represents the measured profile of the sample part. FIG. 18 is a schematic drawing showing a Finite Element Analysis (FEA) predicted filling of a 304 blank 1365 in an open die configuration. FIG. 18 shows the material flow of the 304 blank 1365 when stamped by the multi-fiber punch 1350, and the FEA of the residual stress on the blank 1365. The color blue of the color legend represents the lower end of the residual stress spectrum and the color red represent the higher end of the residual stress spectrum. As shown by FIGS. 17 and 18, the replication of the punch 1350 pattern on to the 304 stainless blank 1365 is directionally consistent with the results of the simulation of the open die process using finite element analysis (FEA). The incomplete filling of the guide pin depression 1360 observed in FIG. 18 is consistent with what is anticipated from an open die tool and with what is experimentally observed. FIG. 19 is an illustration showing three fiber grooves 1367, 1368 and 1369 of a coined 12-fiber ferrule sample 1370. FIG. 20 is a graph illustrating the measured profile data of the same fiber groove from three 304 stainless steel samples and the measured profile data of that feature on the punch 1350. Lines C-E represent the measured profile data of the three samples and Line F represents the measured profile data of the punch. Excellent forming of the lower portion of the groove is observed because, in part, of the natural confinement provide by the surrounding material. FIG. 21 is a graph illustrating the maximum variation of groove location relative to the mean location for three different sample stamped parts, each stamped part having 12 grooves. FIG. 21 shows the excellent part-to-part repeatability. The maximum groove location relative to the mean location is ±160 nm along the x-axis and ±190 nm along the y-axis, demonstrating the sub-micron capability of the ultra precision stamping process.

Figure 15:
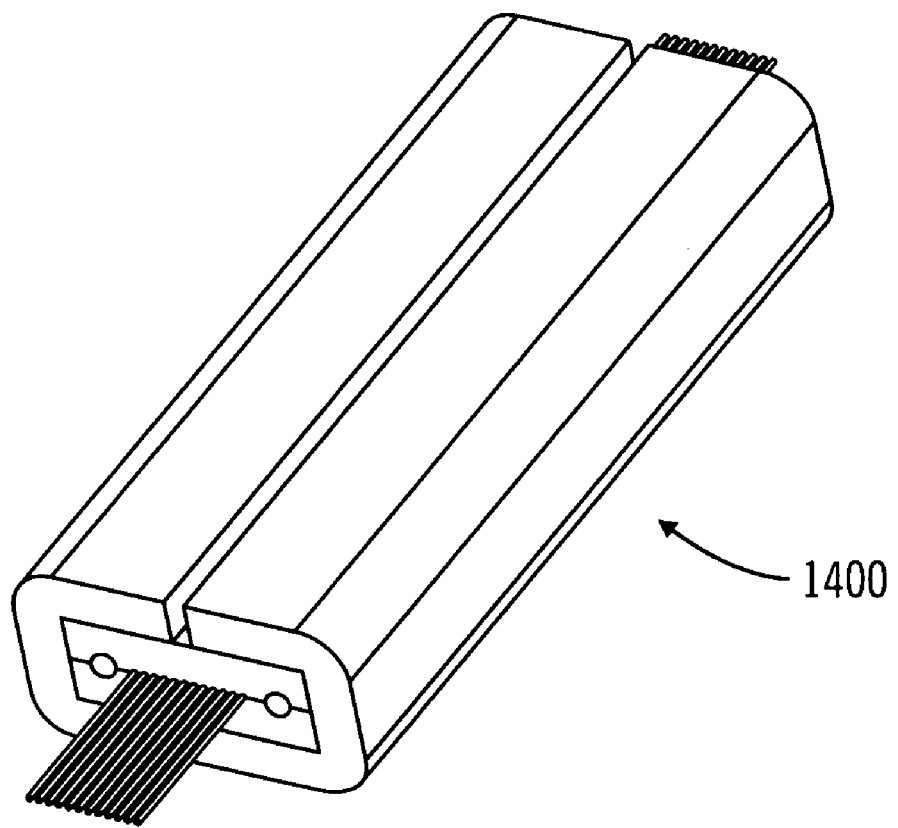
FIG. 15 is a perspective view of a formed multi-fiber sleeve enclosing a multifiber ferrule.

FIG. 15 is a perspective view of a formed multi-fiber sleeve 1400. The sleeve 1400 can replace the pins typically used for alignment of two multi-fiber connectors. As is the case with the cylindrical sleeve/ferrule, the outside dimensions of the multi-fiber ferrule must be designed to match the inside dimensions of the multi-fiber sleeve 1400. This must be done to sub-micron tolerances to assure proper fiber alignment and to minimize optical loss.

While the invention has been particularly shown and described with reference to the preferred embodiments, it will be understood by those skilled in the art that various changes in form and detail may be made without departing from the spirit, scope, and teaching of the invention. A person skilled in the art will recognize that the system incorporating the essence of this invention can also be used to produce other parts requiring sub-micron tolerances. Accordingly, the disclosed invention is to be considered merely as illustrative and limited in scope only as specified in the appended claims.

We claim:

1. An apparatus for producing a part, comprising:
a tool comprising complementary punch and die;
a die holder supporting the die;
a punch guide having a shaft guiding the punch in relation to the die, wherein the shaft is sized and shaped to receive the punch in slidable contact, and wherein the punch and the shaft have flat sliding contact surfaces in a sliding direction; and
an interface capable of mechanically interfacing a force from a press with the punch, wherein the punch is structurally decoupled from the press.

2. The apparatus of claim 1, wherein the die holder includes a pocket nesting a mating surface of the die in confronting orientation with a mating surface of the punch.

3. The apparatus of claim 2, further comprising a backup plate attachable to the die holder over the pocket to secure the die within the pocket.

4. The apparatus of claim 1, further comprising a spacer disposed between the die holder and the punch guide, such that a workspace is defined between the die holder and punch guide where the punch engages with the die to produce the part.

5. The apparatus of claim 4, wherein the punch guide, the die holder and the spacer are provided as a unitary structure.

6. The apparatus of claim 4, wherein the punch guide, the die holder and the spacer are provided as a monolithic structure.

7. The apparatus of claim 1, further comprising a stop disposed between the press and the punch, along a stroke path of the press, for limiting translation of the punch through the shaft.

8. The apparatus of claim 1, further comprising a stop disposed along a stroke path of the punch, limiting translation of the punch through the shaft.

9. The apparatus of claim 8, wherein the punch includes a catch adapted to engage the stop, such that when the catch engages the stop, the stop limits further translation of the punch towards the die.

10. The apparatus of claim 1, further comprising biasing means coupled to the punch, the biasing means being biased when the punch translates towards the die under the force of the press, the biasing means being capable of moving the punch away from the die when the force is removed.

11. A system for producing a part, comprising:
a press having a press bed and a press ram:
at least one stamping station supported on the press bed supporting complementary punch and die, each stamping station comprising:
a die holder supporting the die;
a punch guide having a shaft guiding the punch relative to the die, wherein the shaft is sized and shaped to receive the punch in slidable contact, and wherein the punch and the shaft have flat sliding contact surfaces in a sliding direction; and
an interface capable of mechanically coupling a force from the press ram with the punch, wherein the punch is structurally decoupled from the press ram.

12. The system of claim 11, wherein the interface comprises a ball attached to the punch and a socket attached to the press rain, wherein when ball engages the socket, the press ram is capable of coupling the force from the press ram to the punch, but being structurally decoupled from the punch.

13. The system of claim 11, wherein the interface comprises a ball attached to the press ram and a socket attached to the punch, wherein when ball engages the socket, the press ram is capable of coupling the force from the press rain to the punch, but being structurally decoupled from the punch.

14. The system of claim 11, wherein the lnterface comprises:
an actuator plate coupled to the press ram, the actuator plate being disposed within the shaft between the punch and the press ram, wherein the actuator plate is capable of translating longitudinally along the shaft towards and away from the punch; and
a valve supplying the shaft with low-pressure hydraulic fluid;
wherein when the actuator plate translates towards the punch holder, a uniform, unidirectionally orthogonal farce is exerted on the punch to move the punch towards the die.

15. The system of claim 14, wherein the valve is located between the actuator plate and the punch, the actuator plate being capable of closing the valve when the actuator plate engages the valve as the actuator plate translates towards the punch.

16. The system of claim 15, further comprising a working pressure relief valve coupled to the shaft for actively controlling face exerted on the punch for producing the part.

17. The system of claim 16, further comprising a stop pressure relief valve coupled to the shaft for actively controlling a maximum force exerted on the punch.

18. The system of claim 14, further comprising a stop block located between the punch and the die holder, the stop block inhibiting translation of the punch towards the die holder when the punch bolder contacts the stop block.

19. The system of claim 18, further comprising a spacer disposed between the die holder and the stop block to position the stop block relative to the die holder.

20. The system of claim 14, wherein the interface further comprises a ball attached to the actuator plate and a socket attached to the press ram, wherein when ball engages the socket, the press rum is capable of coupling the force from the press ram to the actuator plate, but being structurally decoupled from the actuator plate.

21. The system of claim 11, further comprising a device in-line machining a work piece before it enters the stamping station.

22. The system of claim 11, further comprising a locating subplate having indexing features adapted to receive the stamping stations and to align the stamping stations relative to each other.

23. The system of claim 22, wherein the indexing features comprise grooves machined on a surface of a subplate.

24. A system as in claim 11, further comprising:
a locating subplate having indexing features adapted to receive the stamping station and to align the stamping station relative to another stamping station; and
a device in-line machining a work piece before it enters the stamping station.

25. A process for producing parts, comprising the steps of:
providing a stamping system for producing a part as in claim 11, wherein the stamping system is configured to produce parts having tolerances within 1000 nanometers; and stamping parts using the stamping system.

* * * * *